US011928427B2

(12) United States Patent
Lee

(10) Patent No.: US 11,928,427 B2
(45) Date of Patent: Mar. 12, 2024

(54) LINGUISTIC ANALYSIS OF SEED DOCUMENTS AND PEER GROUPS

(71) Applicant: AON RISK SERVICES, INC. OF MARYLAND, New York, NY (US)

(72) Inventor: Lewis C. Lee, Atherton, CA (US)

(73) Assignee: AON RISK SERVICES, INC. OF MARYLAND, New York, NY (US)

( * ) Notice: Subject to any disclaimer, the term of this patent is extended or adjusted under 35 U.S.C. 154(b) by 211 days.

(21) Appl. No.: 17/115,249

(22) Filed: Dec. 8, 2020

(65) Prior Publication Data

US 2022/0180059 A1 Jun. 9, 2022

(51) Int. Cl.
*G06F 40/253* (2020.01)
*G06F 16/93* (2019.01)
*G06F 40/30* (2020.01)

(52) U.S. Cl.
CPC ............ *G06F 40/253* (2020.01); *G06F 16/93* (2019.01); *G06F 40/30* (2020.01); *G06F 2216/11* (2013.01)

(58) Field of Classification Search
CPC ........ G06F 40/253; G06F 16/93; G06F 40/30; G06F 2216/11; G06Q 50/184
See application file for complete search history.

(56) References Cited

U.S. PATENT DOCUMENTS

| 7,117,443 B1* | 10/2006 | Zilka | G06Q 50/184 715/739 |
| 2004/0181427 A1* | 9/2004 | Stobbs | G06Q 50/184 705/310 |
| 2005/0108652 A1 | 5/2005 | Beretich, Jr. et al. | |
| 2006/0119900 A1* | 6/2006 | King | G06F 16/40 707/E17.008 |
| 2007/0174039 A1 | 7/2007 | Lin et al. | |
| 2008/0154848 A1* | 6/2008 | Haslam | G06F 16/382 |
| 2009/0083049 A1* | 3/2009 | Sciarrino | G06Q 10/00 705/300 |
| 2010/0131513 A1 | 5/2010 | Lundberg et al. | |
| 2011/0093449 A1* | 4/2011 | Belenzon | G06N 7/01 707/E17.108 |

(Continued)

OTHER PUBLICATIONS

Carvalho, Danilo & França, Felipe & Lima, Priscila. (2014). Extracting Semantic Information from Patent Claims Using Phrasal Structure Annotations. Proceedings—2014 Brazilian Conference on Intelligent Systems, BRACIS 2014. 31-36. 10.1109/BRACIS.2014.17 (Year: 2014).*

(Continued)

*Primary Examiner* — Pierre Louis Desir
*Assistant Examiner* — Keisha Y. Castillo-Torres
(74) *Attorney, Agent, or Firm* — Lee & Hayes, P.C.

(57) ABSTRACT

Systems may perform analyses of claims included in a patent document. The systems may generate one or more search strings from the patent document and provide the one or more search strings to a third-party searching authority. The third-party searching authority may return a collection of documents responsive to the one or more search strings. In particular situations, the systems may re-rank the documents of the collection to provide a patent centric ranking. The systems may also analyze the documents of the collection with respect to the elements of the claims to generate various types of patent infringement and/or invalidity reports.

19 Claims, 11 Drawing Sheets

(56) References Cited

U.S. PATENT DOCUMENTS

| | | | |
|---|---|---|---|
| 2011/0191310 A1* | 8/2011 | Liao | G06F 16/313 |
| | | | 707/723 |
| 2012/0102427 A1 | 4/2012 | Fenster et al. | |
| 2013/0013603 A1* | 1/2013 | Parker | G06F 16/353 |
| | | | 707/E17.046 |
| 2013/0282735 A1* | 10/2013 | Pedersen | G06F 16/3323 |
| | | | 707/748 |
| 2014/0324808 A1* | 10/2014 | Sandhu | G06F 16/31 |
| | | | 707/706 |
| 2017/0075877 A1 | 3/2017 | Lepeltier | |
| 2018/0341630 A1* | 11/2018 | DeVries | G06F 40/14 |
| 2020/0050638 A1* | 2/2020 | Hancock | G06F 16/90344 |
| 2021/0326714 A1* | 10/2021 | Li | G06F 16/3329 |
| 2022/0004545 A1 | 1/2022 | Arvela | |

OTHER PUBLICATIONS

The International Search Report and Written Opinion for PCT Application No. PCT/US21/59772, dated Feb. 7, 2022, 9 pages.

Office Action for U.S. Appl. No. 17/115,338, dated Apr. 13, 2023, "Linguistic Analysis of Seed Documents and Peer Groups", 35 pages.

Office Action for U.S. Appl. No. 17/115,338, dated Oct. 5, 2022, Andrews, "Linguistic Analysis of Seed Documents and Peer Groups", 36 pages.

Office Action for U.S. Appl. No. 17/115,338, dated Aug. 3, 2023, Andrews, "Linguistic Analysis of Seed Documents and Peer Groups", 40 pages.

\* cited by examiner

LINGUISTIC ANALYSIS OF SEED DOCUMENTS AND PEER GROUPS

BACKGROUND

The amount of information contained in documents is rapidly increasing. There are many industries such as education, journalism, politics, economics, etc. that have benefited from increases in rapid and low-cost artificial or computer aided document analysis. However, advances in artificial intelligence and document analysis tasks are primarily focused on natural language processing using rules of grammar associated with the spoken and written language. Unfortunately, in highly specialized industries, such as patent law, the documents produced and analyzed have their own structure and rules that differ from those of the natural langue in which the documents are written. These specialized documents require subjective judgment of individuals having expert knowledge in the field to understand and interpret them. Thus, most document analysis in highly specialized industries is performed manually making it effectively impossible or impracticable to perform document analysis at the scale, speed, or cost desired by the industry.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

Figure 1:
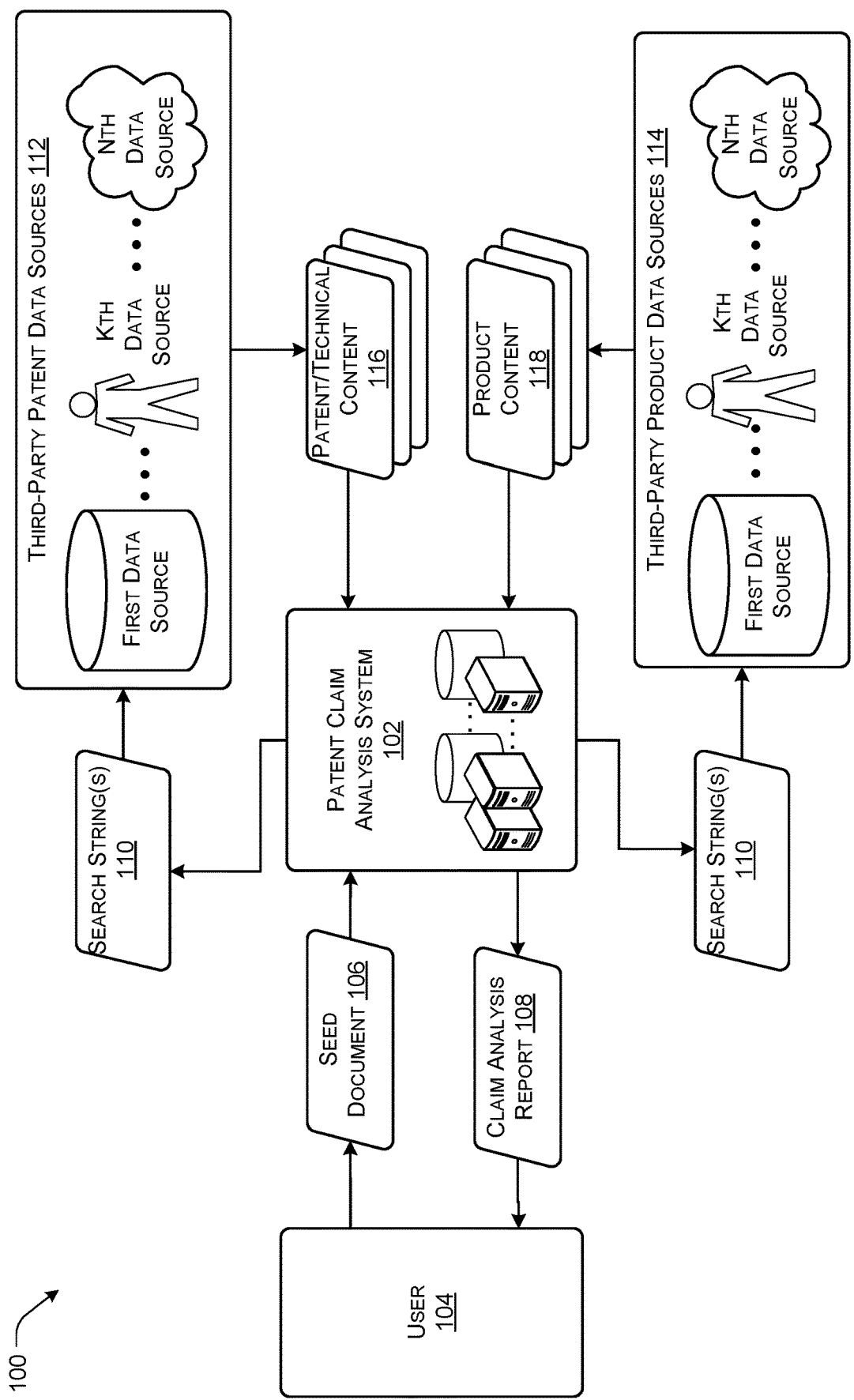
FIG. 1 shows an example block diagram of a system for performing claim analysis according to some implementations.

In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

Techniques described herein are directed to systems and processes for performing claim analysis and generating documents based on the claim analysis from an initial patent, claim, or seed document. For example, systems described herein may perform claim analyses that assist in the evaluation of relative breadth of claims of patents or seed documents as compared to other claims within a collection of patents or documents in a technology area. Additionally, systems described herein may identify products that correspond to elements of one or more claims included in a seed document. Further, systems described herein may identify additional patent documents that correspond to elements of one or more claims included in the seed document.

The systems may evaluate a claim by parsing the language in the claim to identify independent concepts, limitations, or claim elements contained within the claim. To illustrate, the system may perform a syntactic analysis of claims to identify various parts of speech in the claims and combinations of words in the claims to identify single words or groupings of words that may be labeled as limitations. A collection of limitations in a claim may be labeled as elements of the claims. The words included in the claims may also be analyzed to determine unique words within the claims. In certain implementations, unique words can refer to words in a claim that are used only once in the claim. The analysis of the claims may generate various metrics for the claims, such as total number of words, number of claim limitations, number of claim elements, number of unique words, and so forth. The system may analyze the claim metrics to rank claims with respect to each other. In particular implementations, a measure of the breadth of the claims may be determined based on the metrics for a claim with respect to metrics of other claims within a peer group.

The systems may also utilize the identified concepts, limitations, or elements to produce one or more search strings that may be used to identify a collection of documents related to a seed document. In particular implementations, the systems may be configured to detect one or more claims within a seed document or collection of seed documents, extract or isolate claim elements within the claims, and generate one or more search strings. The one or more search strings may be used to identify a collection of related documents or products. A collection of related documents may be identified based on patent class/subclass, peer groups, selected by experts in the field, or received as part of a patent portfolio of an organization.

In some instances, the systems may re-rank the collection of related documents to more closely approximate or simulate the order or rank that would be applied by an expert in the industry. For example, a third-party search authority may return documents in response to search strings that are ranked according to criteria that have been set by the third-party searching authority. However, the criteria used to rank the search results may not correspond to criteria that are important to an individual that is interested in the search results for patent analysis. Accordingly, the systems may re-rank the search results according to a different set of criteria to surface documents that may be of interest to an expert in the field of intellectual property. In illustrative examples, the systems may rank claims within the seed document and/or collection of documents across a spectrum from, for instance, broadest to narrowest.

The systems may also generate various reports based on the analysis of claims included in patent documents. For example, the systems may generate claim (or claim element) to document mappings and/or claim (or claim element) to product mappings. The mappings to claims or claim elements may be utilized to generate various reports that may provide information related to the analysis of patents. To illustrate, mappings between claim elements and features of products may indicate possible infringement of one or more claims by a particular product. In other examples, mappings between claim elements and a detailed description may indicate a measure of validity of the claim elements. The systems may also generate patent valuation estimations, claim ranking reports, or other reports usable by experts in the field based the analysis of a collection of related documents and/or the seed documents.

FIG. 1 shows an example block diagram of a system 100 for performing claim analysis according to some implementations. In the illustrated example a patent claim analysis system 102 may receive, from a user 104 or user computing device, a seed document (or collection of seed documents) 106 requesting a claim analysis report 108. The seed document 106 may be one or more patent documents that include at least one claim to be analyzed by the patent claim analysis system 102. In some instances, the claim analysis report 108 may include mappings of claims or claim elements to documents, such as patents. The claim analysis report 108 may also include mappings of claims or claim elements to one or more products. Additionally, the claim analysis report 108 may include usage frequency of claim terms. Further, the claim analysis report 108 may include claim validity or invalidity analyses or reports, patent valuation estimations, claim ranking reports, claim charts, as well as other mappings, charts, or reports usable by experts in the field based on the collection of related documents and/or the seed documents.

In illustrative examples, the patent claim analysis system 102 may receive the seed document 106 and parse the seed document 106 to detect one or more claims and extract or isolate elements or terms within the claims. In various implementations, the patent claim analysis system 102 may identify independent claims that are distinguished from the dependent claims using regular expressions, machine learning classifiers, embedded tags (e.g. XML), or other methods of identifying claim boundaries and dependency information. For at least a subset of the claims identified, the patent claim analysis system 102 may ingest the claim language to identify a set of claim elements. In particular implementations, the patent claim analysis system 102 may parse the claim language using a claim parsing engine. The claim parsing engine may perform syntactical analysis to provide one or more of sentence structure, part of speech (POS) tagging, predicate argument structure (PAS), noun-phrase identification, entity type assignment, and/or co-reference chain identification. Co-reference chains may refer to two or more words or expressions that refer to the same noun. Potentially, multiple sets of linguistic analysis results may be produced by the claim parsing engine, as in some instances, the claim language may be ambiguous.

The patent claim analysis system 102 may include a linguistic analyzer for natural language processing (NLP). The linguistic analyzer may break claims into digestible segments, such as words, phrases, sentences, or other definable text-strings. The linguistic analyzer may have a set of NLP components that perform various language analyses on the text strings. A syntactic parser identifies the parts of speech of words and the grammatical relationships between the parts of speech of the words in a sentence. In certain implementations, the syntactic parser may be implemented in part based on the Stanford Core NLP package for syntactic parsing or the Natural Language Toolkit (NLTK). The part of speech tagging may be augmented with a claim element grouping process that uses part of speech tags to group individual claim portions into larger units. In some cases, a claim-specific grammar that identifies language structures indicative of an element of a claim may be used to generate the claim elements. For example: "{<A.*>* <NN> <IN> <NNS>+}" may indicate a language structure associated with one or more articles followed by a singular noun followed by a conjunction followed by a plural nouns, such as "a plurality of widgets." In this example, the claim specific grammar identifies language structure indicative of a single noun-phrase that is likely to indicate an element of a claim, such as a single piece of structure.

The linguistic analyzer may also include a PAS module that produces a parser-neutral representation of predicates and instantiated arguments of the parser-neutral representation of predicates. The PAS module may transform a parser-specific representation of grammatical relations to a common representation of predicates and arguments so that grammatical information produced by different parsers may be interoperated by the patent claim analysis system 102. In the process, the PAS module may also perform certain normalization procedures, such as changing passive voice into active voice, and simplify representations of grammatical relations by removing certain grammatical relations that are not central to processing of the claims.

In particular implementations, after the linguistic analysis, the patent claim analysis system 102 may generate one or more search strings 110 based on one or more element portions identified in the claims of the seed document 106 to provide to third-party searching authorities. In some examples, the patent claim analysis system 102 may perform natural language processing to determine commonly used alterative phrasing of a search string 110 and, thereby, generate multiple search strings 110 through the use of semantically similar words, synonym expansion, stemming, or other similar techniques to expand the original claim language into a broader search term.

One technique that may be used to generate a broader search term is to use a word or phrase vectorization technique, such as word to vector (Word2Vec) model, trained on a document corpus similar to the seed document. Once the Word2Vec model has been trained, a noun from a claim term may be submitted to the Word2Vec model and the Word2Vec model may return the most semantically similar terms. For instance, a claim may recite LIDAR as an element, and the Word2Vec model may return SONAR and RADAR as similar terms. A search string can then be constructed that uses a Boolean search for LIDAR OR RADAR OR SONAR, as the Word2Vec model indicated all three terms were similar. Thus, it should be understood that the claim elements, modified claim elements, and/or other phrasing and content may be included as part of the one or more search strings 110. For example, since claim language often differs from the language used in marketing materials, the patent claim analysis system 102 may generate natural language search strings that correspond to the actual claim element language, but may not include some of the words of the claim elements.

In various implementations, the third-party searching authorities may obtain the one or more search strings 110 and search third-party data sources, such as third-party patent data sources 112 and/or third-party product data sources 114. The third-party patent data sources 112 may be a data sources that store legal data (such as patents), technical data (such as white papers), web pages, or other documentation relevant to the understanding of the intellectual property included in the seed document 106. The third-party product data sources 114 may include websites or other online resources that include product listings, advertisements, offers for sale, product manuals, or other documents related to a number of products. In illustrative implementations, the third-party search authorities that have access to the third-party patent data sources 112 and/or the third-party product data sources 114 may identify documents, data, and/or content, such as patent/technical content 116 and/or product content 118, that are returned as results of searches made according to the one or more search strings 110.

After receiving the patent/technical content 116 and/or the product content 118 from the third-party data sources 112 and/or 114 as search results based on the one or more search strings 110, the patent claim analysis system 102 may re-rank the content or collection of documents included in the search results. For example, the patent claim analysis system 102 may re-rank the content 116 and/or 118 based at least in part on a claim element to specification mapping and/or a claim element to content (document collection) mapping. To illustrate, the patent claim analysis system 102 may rank claim elements having a high usage rate within the specification (as determined from the claim element to specification mapping) as more relevant or more important with respect to the seed documents 106. The patent claim analysis system 102 may then re-rank the content 116 and/or 118 from the collection having a higher usage of more highly ranked claim elements as more relevant to the seed document 106. The patent claim analysis system 102 may also utilize additional information, such as the description of drawings of the seed document 106, to re-rank the search results that include the content 116 and/or 118. That is, the description of drawings of the seed document 106 may provide additional meaning and/or context for one or more terms included in the one or more search strings 110 and be utilized by the patent claim analysis system 102 to identify content 116 and/or 118 that is relatively more relevant than other content 116 and/or 118.

The re-ranking 116 and/or 118 may also be accomplished using a Word2Vec model to measure the semantic similarity between search terms and destination words. For instance, a claim element reciting LIDAR may re-rank a document higher because the document contains the word LIDAR, but the document may also re-rank a document higher because the document contains a related word, such as SONAR or RADAR. In one example, the semantic distance, such as computed by the cosine similarity of word vectors in the Word2Vec model, may be used to measure the similarity of words and discount the rank boost based on a similarity score between two words (e.g., how similar are the two words), or the re-ranking 116 and/or 118 may be accomplished by looking at the N most similar words as measured by cosine similarity (e.g. where n=5) and treating the N most similar words as identical to the recited term in the claim.

Additionally, groups of claim terms can be combined using a word or phrase vectorization technique (e.g. Word2Vec, BERT, ELMO, LSTM, GLOVE, TFIDF) that produces word vectors using embeddings or other vectorization techniques. Embedding and other vectors can be combined using vector operations such as addition and normalization to combine individual element words into a single vector representing that word. For instance, the vector for each of the words "phased", "antenna", and "array" can be combined to for a vector that represents the concept of a phased antenna array. This vector can be used in a model, such as a trained Word2Vec model to measure the similarity to other words or phrases for re-ranking or searching purposes.

In additional implementations, once the linguistic analysis results associated with the claims are produced, the patent claim analysis system 102 may generate a claim profile. For example, the words of the claims included in the seed document 106 may be tagged or labeled to assist the patent claim analysis system 102 in processing the phrase structure. The patent claim analysis system 102 may then utilize the tagged claims to generate one or more claim profiles. The claim profile may include one or more of the claim limitations and/or claim metadata. Claim metadata may include one or more of word count, unique word count, unique word count with stemming, unique word count without stemming, unique word count with stop words removed, unique word count without stop words removed, limitation count, list of limitations, element count, list of elements, or other metrics related to the claims. In certain illustrative examples, a "limitation" may be defined as a word or phrase that conveys a singular concept. For instance, a limitation may include nouns (e.g., widget, body), noun/adjective couplings (e.g., first widget, cylindrical shaped body), verbs (e.g., cover), and verb/adverb couplings (e.g., partially cover). In additional illustrative examples, an "element" is defined as a collection of syntactically related limitations, perhaps according to parts of speech labeling or predicate argument structure labeling. An illustrative example of an element that includes predicate-arguments comprises "a first widget having a cylindrical body shape", where "having" is the verbal predicate, "widget" is the subject argument, and "body" is the object argument.

Based on the claim profiles and/or the ranked search results, the patent claim analysis system 102 may generate one or more claim analysis reports 108. The claim analysis reports 108 may include claim validity or invalidity analysis or reports, patent valuation estimations, claim ranking reports, as well as other mappings, charts, or reports usable by experts in a field based on the one or more seed documents 106. For example, the patent claim analysis system 102 may generate a document having columns that include information, for each claim or claim element, as follows: (i) claim element, (ii) search terms associated with the claim element, (iii) citation to a related document (e.g., a document having the same classification as the seed document 106 or included in the same patent portfolio as the seed document 106), (iv) content from the patent/technical content 116 related to the claim element, (v) content from the product content 118 related to the claim element, (vi) a confidence rating (e.g., an indicator of relevance of the content 116 and/or 118 with respect to the claim element), among other information that may be found in additional columns. In particular implementations, the document may also include a number of rows, where each row corresponds to a different element or portion of a claim.

Figure 2:
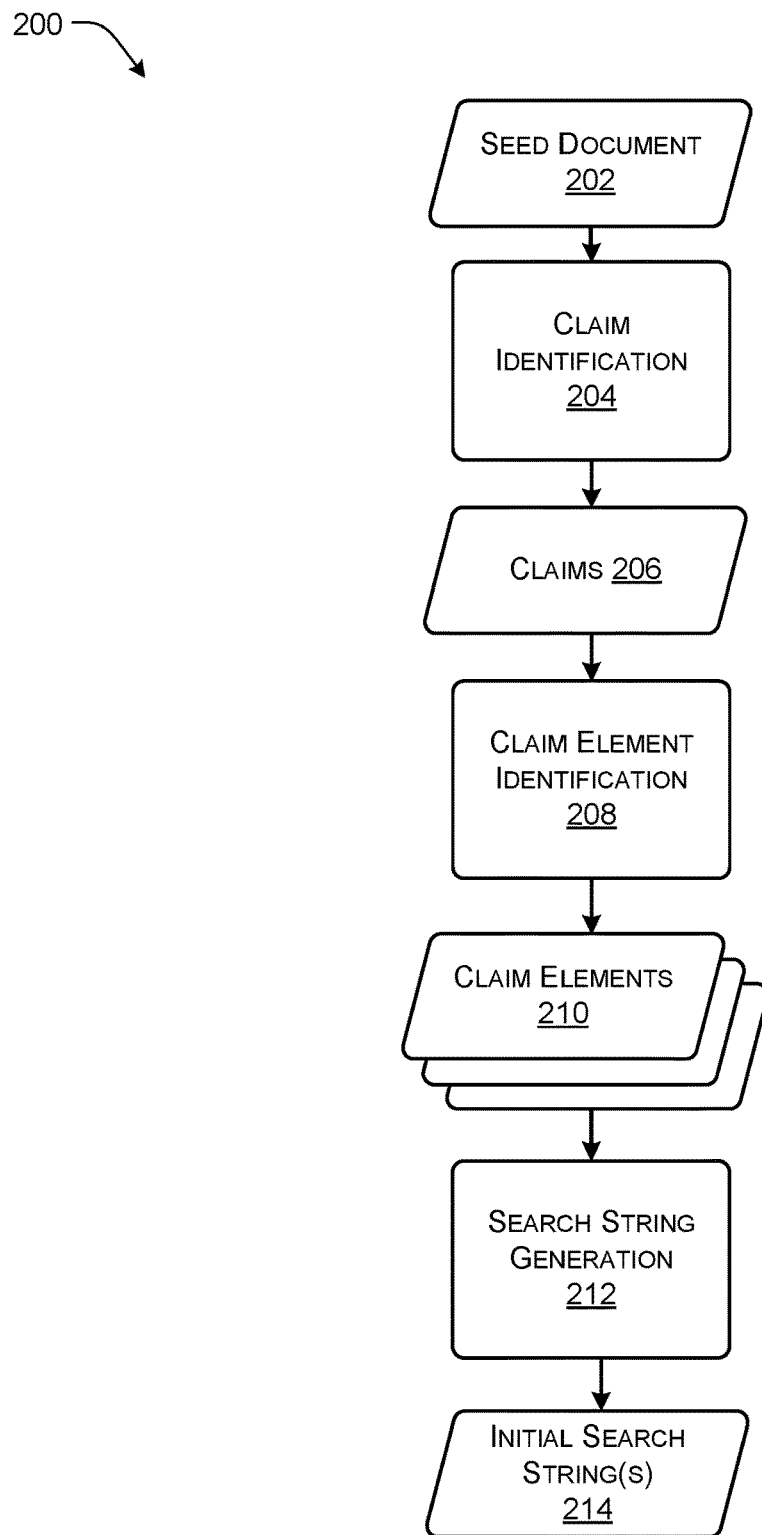
FIG. 2 shows an example processing pipeline for generating one or more search strings according to some implementations.

FIG. 2 shows an example processing pipeline 200 for generating one or more search strings according to some implementations. As discussed above, the patent claim analysis system 102 of FIG. 1 may receive a seed document or collection of seed documents and generate one or more claim analysis reports based on the one or more seed documents. In some cases, the patent claim analysis system 102 may first generate one or more initial search strings prior to analyzing the one or more seed documents. In certain examples, the one or more seed documents may be analyzed with respect content identified by third-party searching authorities based on the one or more initial search strings.

Initially, the patent claim analysis system 102 may receive one or more seed documents 202 from a user or computing device. For instance, the seed documents 202 may include one or more claims, one or more patents, one or more patent applications and/or other types of documents associated with a patented or claimed product. As an illustrative example, the seed documents 202 may include a patent having at least one claim and a technical manual associated with a product protected by the patent. In this case, the technical manual may be used to provide additional details or content usable by the patent claim analysis system 102 in generating claim analysis reports.

The patent claim analysis system 102 may perform claim identification 204 on the seed documents 202. For instance, the patent claim analysis system 102 may identify the content associated with the claims 206 as well as the remainder of the content (e.g., the content distinct from the claims) within the seed documents 202. In some other examples, the patent claim analysis system 202 may determine the content associated with the claims via document labels or identifiers within the seed documents 202. For instance, the portion of a seed document 202 including the claims 206 may have a title or section header that identifies the portion of content as claims 206 separate from other portions. As an illustrative example, a document in CSV format may have all the claims in the same column which is designated as containing claims. Alternatively, an HTML, XML, SGML, or other similarly tagged document may have specific tags on each claim 206 indicating that a portion of the document is a claim 206 and whether it is an independent or dependent claim.

In other cases, the claims 206 analyzed the patent claim analysis system 102 may be included in other document types, such as aversion of a PDF document that has undergone an optical character recognition (OCR) process, that may contain undifferentiated content. The specific technique for detecting claims 206 may vary based on the document format. For example, if a page of a seed document 202 includes the word "claim" or "claims" within the first line and is followed on that same page by a paragraph beginning with a number followed by a period, then that paragraph or entire page may be designated as a claim 206. In additional implementations, any paragraph including a line ending with a semicolon may be interpreted as a claim. Other recognition techniques may be alternatively or additionally applied. In illustrative examples, the patent claim analysis system 102 may parse the content included in the seed documents 202 using a parsing engine and perform syntactical analysis on the content. The syntactical analysis may identify content of the seed documents 202 that corresponds to a template for patent claims. That is, the patent claim analysis system 102 may distinguish the claims 206 from the remainder of the content of the seed documents 206 based on a linguistic analysis because patent claims have a distinct structure when compared with typical text or content included in various documents.

Following identification of the claims 206, the patent claim analysis system 102 may also ingest the content associated with the claims 206 to perform claim element identification 208. For example, a claim parsing engine and/or a linguistic analyzer may parse the claims into digestible segments or elements 210, such as words, phrases, sentences, or other definable text-strings. The claim parsing engine and/or linguistic analyzer may have a set of NLP components or rules that are customized to claim language and can perform various language analyses on the text of the claims. In some cases, the words of the claims may be tagged or labeled to assist the patent claim analysis system 102 in understanding the phrase structure. Using the tagged claims, the patent claim analysis system 102 is able to generate or distinguish claim elements 210.

The patent claim analysis system 102 may also perform search string generation 212 based at least in part on the claim elements 208. For instance, the patent claim analysis system 102 may extract one or more words from one or more claim elements and include the extracted words in a search string. In particular implementations, the patent claim analysis system 102 may determine a narrowest claim element included in the seed document 202 and include one or more words from the narrowest element of the seed document 202 in the search string. The patent claim analysis system 102 may determine a narrowest claim element based on frequency of usage of one or more words included in the claim element before a priority date of the seed document 202 and the frequency of usage of the one or more words included in the claim element after the priority date of the seed document 202. In certain situations, the patent claim analysis system 102 may generate a search string that includes one or more words that have a relatively low frequency of usage before the priority date of the seed document 202 and a relatively high frequency of usage after the priority date of the seed document 202. The term frequency analysis may be performed on a corpus of documents, such as the entire US patent corpus, or on a subset of the corpus, such as patents that share a CPC code or portion of a CPC code with the seed patent.

Figure 3:
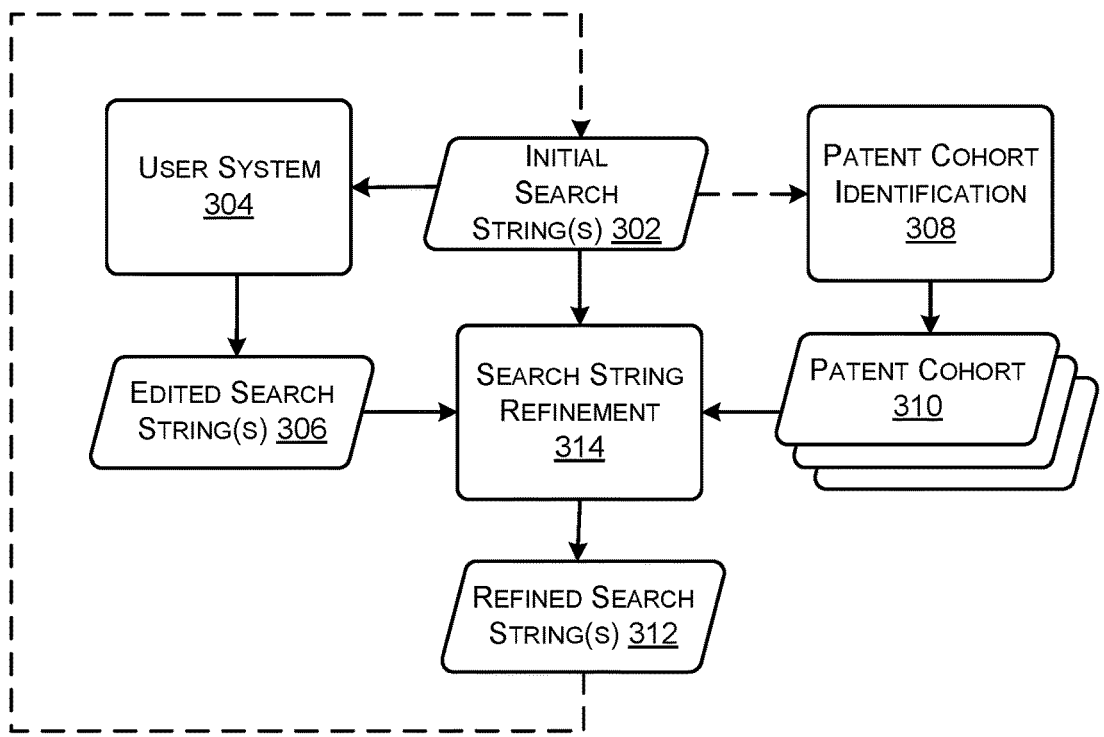
FIG. 3 shows an example processing pipeline for generating refined search strings according to some implementations.

FIG. 3 shows an example processing pipeline 300 for generating refined search strings according to some implementations. In various implementations, the patent claim analysis system 102 may utilize an iterative approach to the generation of search strings. Different documents may be identified in the search results for the different search strings. Thus, by utilizing an iterative approach to the generation of search strings and, thereby, modifying the collection of documents returned in response to the search strings, the documents identified by the patent claim analysis system 102 may be more likely to be related to a seed document.

In the current example, the pipeline 300 may include receiving one or more initial search strings 302, such as the initial search strings 214 of FIG. 2. The patent claim analysis system 102 may be configured to provide the initial search strings 302 to a user or user system 304, such that an expert in the field may modify or edit one or more of the search strings to generate edited search string(s) 306. For instance, an expert in the field of patent law may add alternative wording, additional search strings, or remove search strings from the initial search strings 302. As an illustrative example, the expert may receive a search string "computer-readable media" and add a search string that includes "memory devices," which is more likely used in non-patent documentation.

The patent claim analysis system 102 may also identify a cohort of related patent documents at 308 and utilize the patent cohort 310 to perform search string refinement at 312. In one specific example, the patents of the patent cohort 310 may be provided as part of the seed documents used to generate the one or more initial search strings 302. In some situations, the patent cohort 310 may comprise a patent portfolio that includes one or more seed documents. In additional examples, the patents of the patent cohort 310 may be documents identified by a searching authority in response to a search performed using the initial search strings 302.

In the illustrated example, the patent claim analysis system 102 may receive either or both of the edited search strings 306 and/or the patents of the patent cohort 310 and utilize either or both to generate one or more refined search strings 314 via the search string refinement process 312. For example, the patent claim analysis system 102 may generate a claim element to document collection mapping or a claim element/search string frequency hit table for each document of the patent cohort 310. The patent claim analysis system 102 may then select or prune the initial search strings 302 based on a frequency of occurrence of the specific search term with respect to the patents of the patent cohort 310. In particular implementations, the patent claim analysis system 102 may determine a frequency of occurrence of each of the initial search strings 302 within the patents of the patent cohort 310 and remove one or more of the initial search string(s) 302 based on their frequency of occurrence in the patent cohort 310. In certain implementations, the patent claim analysis system 102 may operate to generate a search string that includes relatively narrow elements or limitations of a claim.

The search string may also be refined based on the number of returned documents in the search target corpus. For instance, a maximum and minimum threshold of documents may be set. The search string can be submitted to the search engine and a number of responsive documents may be returned. If the responsive number is too high (e.g., greater than the maximum threshold of documents), the search string can be made more restrictive by adding additional search terms with AND clauses or changing Boolean search terms from OR to AND. The system may then resubmit the search string and a new number of responsive documents are received. Again, if the responsive number is too high, the search string is again made more restrictive and the new or updated string may be submitted. In this manner, the search string can continue to be refined until the number of responsive documents is reduced below the maximum threshold of documents (e.g., a human manageable or readable number of documents are received).

Similarly, if the responsive number is too low (e.g., less than the minimum threshold of documents), the search string can be made less restrictive by adding more search terms with OR clauses or changing AND clauses to OR. Again, updating the search string may be an iterative process until a number of responsive documents is increased over the minimum threshold of documents.

The patent claim analysis system 102 may continue to refine the search strings for a predetermined number of iterations. In additional implementations, the patent claim analysis system 102 may continue to refine the search strings until the difference between the initial search strings 302 and the refined search strings 314 is less than a difference threshold. Thus, the refined search strings 314 may be used as an input to the next iteration of the pipeline 300 until one or more criteria have been satisfied.

Figure 4:
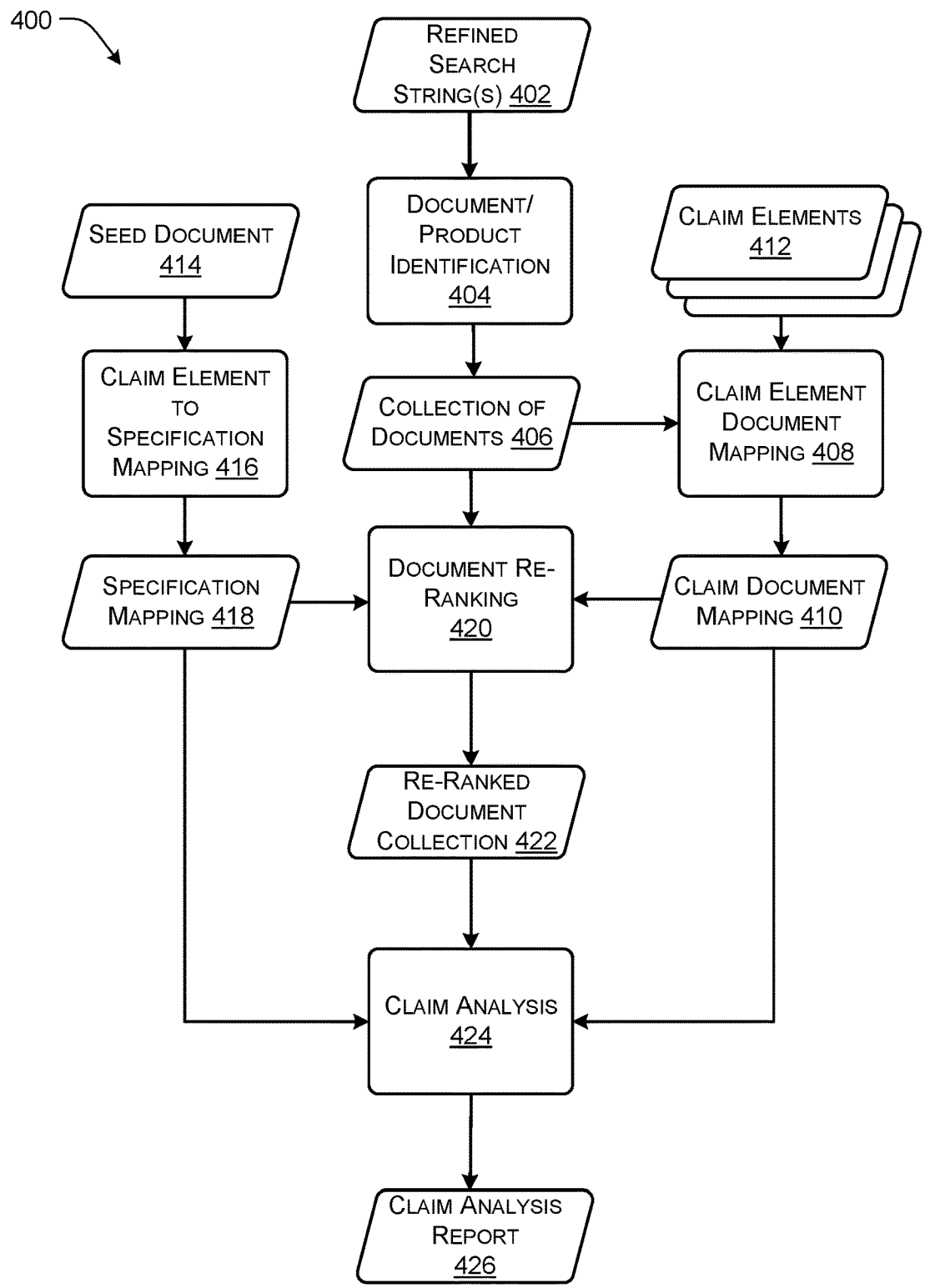
FIG. 4 shows an example processing pipeline for generating a claim analysis report according to some implementations.

FIG. 4 shows an example processing pipeline 400 for generating claim analysis reports according to some implementations. In some cases, refined search strings 402 may be generated, such as via the example pipeline 300 of FIG. 3, and the patent claim analysis system 102 may utilize the refined search strings 402 to perform document/product identification 404 and, thereby, generate one or more claim analysis reports.

In the illustrated example, the patent claim analysis system 102 may provide the refined search strings 402 to a third-party searching authority, which may return search results that include a collection of documents or content 406. In some cases, the third-party searching authorities may return documents or content 406 that include legal documents (such as patents or briefs), technical data (such as white papers, text books, or user manuals), product listings or offers for sale (such as online webpages or content), or advertisements, among other types of documents.

Once the collection of documents 406 is received from the third-party searching authorities, the patent claim analysis system 102 may perform claim element to document collection mapping 408. For example, the patent claim analysis system 102 may generate a claim document mapping 410 that includes content from and/or citations to one or more documents of the collection of documents 406 for one or more claim elements 412 included in at least one seed document 414 used to generate the refined search strings 402. The claim element document mapping 408 may also include a hit table or frequency of occurrence of one or more of the claim elements 412 per document included in the collection of documents 406.

The pipeline 400 may also process the seed document 414 via a claim element to specification mapping process 416 to generate a specification mapping 418. For example, the specification mapping 418 may be useful to identify definitions, limitations, or alternative meanings for each claim element 412. In some cases, the specification mapping 418 may include a claim element usage or frequency of occurrence of claim elements within the specification of the patent seed document 414. The patent claim analysis system 400 may use search strings to similar to those used to search the collections of documents, but instead use the similar search strings to search the specification of the seed patent. For instance, if the term LIDAR is used in the claim language, the search string might include LIDAR, SONAR, and RADAR. If LIDAR and SONAR are found in the specification, then the claim specification mapping system may use the terms LIDAR and SONAR and weight them equally in the search results, while RADAR may be omitted from the search and/or ranked lower. Additionally, the specification mapping component may find the term SONAR in the specification and include adjacent terms in a search string. For instance, the specification may contain the sentence "LIDAR uses laser energy to detect nearby objects." The search term may detect the noun phrase "laser energy" using known NLP techniques and include "Laser Energy" in a search and/or re-ranking query. "Laser Energy" may also be inputted into a word vector model, such as Word2Vec, to create a single vector and/or discover terms related to "Laser Energy," for instance "Acoustic Energy" would be an example.

The patent claim analysis system 400 may also perform document re-ranking 420. Since patents, as well as other intellectual property documents, have a unique structure, rules of grammar, and vernacular, the documents returned by the third-party search authority are often not in an order that may more closely reflect or substantially mirror a ranking of importance or value applied by an expert in the field of intellectual property law. Thus, in some implementations, the patent claim analysis system 102 may re-rank the collection of documents 406 to rank documents with potentially higher relevancy above documents having potentially less relevancy. For instance, the patent claim analysis system 102 may re-rank the collection of documents 406 such that documents more relevant to patent analysis may be located higher in the search results. The document re-ranking 420 may be used as a pre-screening for documents that may be reviewed by an expert in the field of intellectual property law. In this way, documents that are more likely relevant may be presented to the expert first and are located higher on the list in order to facilitate a more efficient review of documents.

In various implementations, the patent claim analysis system 102 may re-rank the collection of documents 406 based at least in part on metrics related to the claim elements 412, as well as the specification mapping 418 and/or the claim document mapping 410. For example, the patent claim analysis system 102 may rank claim elements having occurrences that indicate a relatively high usage rate within the specification of the seed document 414 as more relevant with respect to the seed document 414. The patent claim analysis system 102 may then re-rank documents from the collection of documents 406 having a higher frequency of one or more of the claim elements 412 within the collection of documents 406 more highly.

In particular implementations, the patent claim analysis system 102 may perform claim analysis 424 with respect to one or more claims of the seed document 414 based at least in part on the re-ranked document collection 422. The patent claim analysis system 102 may also utilize the specification mapping 418 and the claim document mapping 410 to assist with the claim analysis 424. For example, the patent claim analysis system 102 may generate one or more claim analysis reports 426. The one or more claim analysis reports may include claim charts, claim validity or invalidity analyses or reports, patent valuation estimations, claim ranking reports, as well as other mappings, charts, or reports usable by experts in the field based on the collection of documents 406 and/or the seed document 414. For example, the patent claim analysis system 102 may generate a document having columns that include information, such as: (i) claim element(s), (ii) search terms associated with the claim element(s), (iii) citation to one or more documents included in a collection of documents related to a claim element (e.g., a document having the same classification as the seed document 106 or included in the same patent portfolio as the seed document 414), (iv) specific content from one or more documents included in the collection of documents related to the claim element, (v) content from documents that are related to products corresponding to the claim element, (vi) a confidence rating (e.g., an indicator of relevance of the collection of documents 406 to the claim element), among other information that may be included in additional columns. In one specific example, the patent claim analysis system 102 may, as part of the claim analysis 424, generate or determine potential definitions of claim elements, potential limiting features, potential examples of the claim element within the collection of documents 406 or the seed document 414, and so forth that may be included in the claim analysis report(s) 426.

Figure 5:
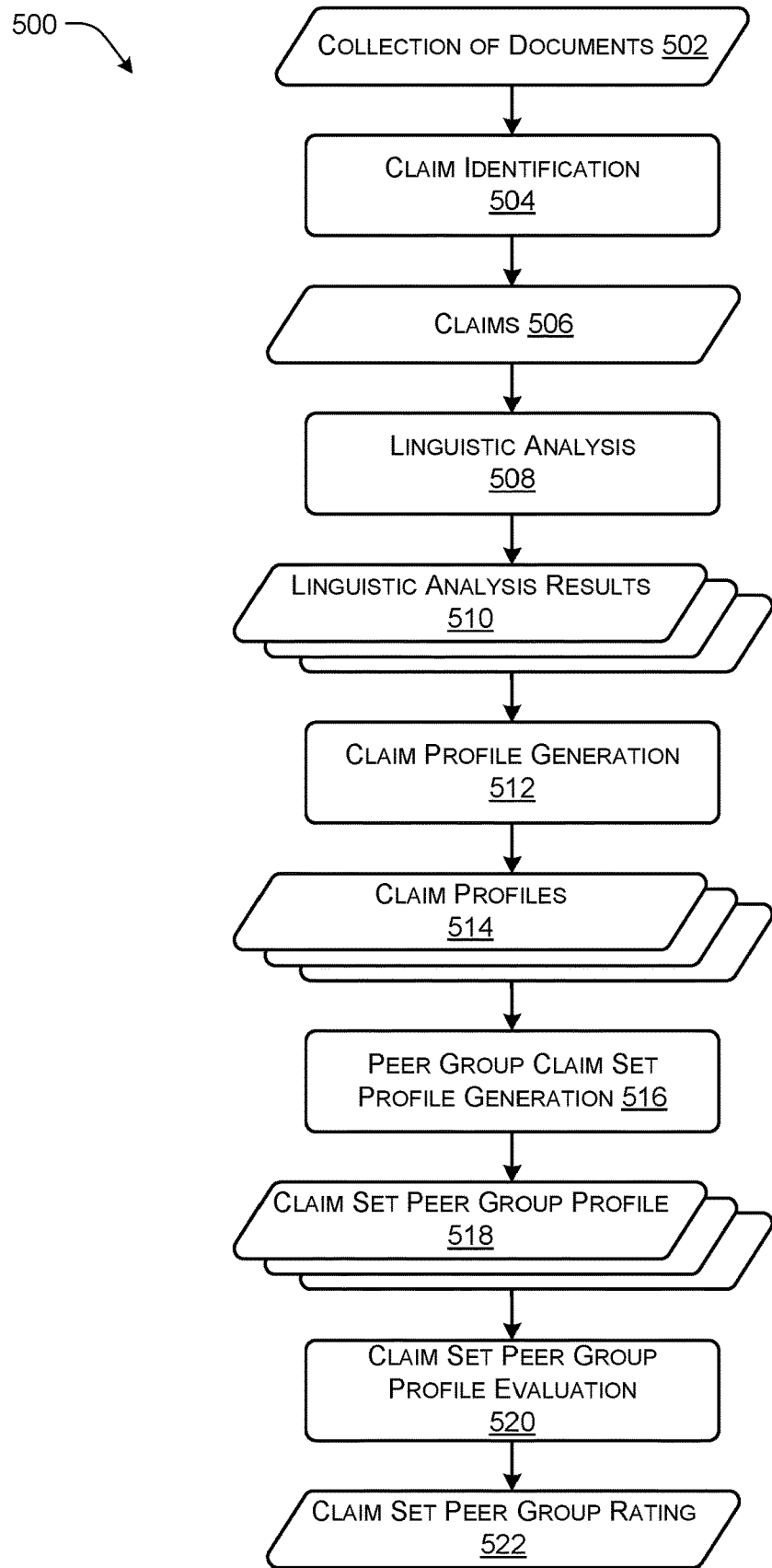
FIG. 5 shows another example processing pipeline for generating a rating for a peer group of documents according to some implementations.

FIG. 5 shows another example processing pipeline 500 for generating a rating for a peer group of documents according to some implementations. In various implementations, the patent claim analysis system 102 may generate one or more patent analysis reports without the use of a third-party searching authority. In these examples, a user may provide a collection of documents 502 as the initial input or as a collection of seed documents. The patent claim analysis system 102 may then analyze the collection of documents 502 based on a comparative study between each document in the collection 502 with respect to the other documents of the collection 502. In these implementations, the claim analysis reports may include various metrics and/or ratings of claims and/or claim elements included in the collection of documents 502 with respect to one another.

In particular implementations, for each document of the collection of documents 502, the patent claim analysis system 102 may perform claim identification 504 to initially identify a number of claims 506 contained within the collection of documents 502. In various implementations, the patent claim analysis system 102 may differentiate independent claims from the dependent claims. For the claims 506, the patent claim analysis system 102 may perform a linguistic analysis 508 to produce linguistic analysis results 510. For example, the patent claim analysis system 102 may parse the language of the claims 506 using a claim parsing engine. The claim parsing engine may perform syntactical analysis to provide one or more of sentence structure, word embeddings, POS tagging, PAS, entity type assignment and/or co-reference chains with respect to the claims 506. Potentially, multiple sets of linguistic analysis results 510 may be produced by the claim parsing engine, as in some instances, at least some of the language of one or more of the claims 506 may be ambiguous.

In particular implementations, the set of linguistic analysis results 510 may include a syntactic parse (e.g., a claim structure diagram) that provides information pertaining to sentence structure of the claims 506. In one implementation, the claim parsing engine may be configured to include a linguistic analyzer for NLP. For instance, the linguistic analyzer may segment the claims 506 into words, phrases, sentences, or other definable text-strings. The linguistic analyzer may have a set of NLP components that perform various language or linguistic analyses 508 on text strings associated with the claims 506. In certain implementations, a syntactic parser may identify the parts of speech of words and the grammatical relationships between the POS of the words in a claim or claim element. The linguistic analyzer 508 may also include predicate argument structure instructions that may produce a parser-neutral representation of predicates and instantiated arguments of the parser-neutral representation of predicates. The PAS instructions may transform a parser-specific representation of grammatical relations to a common representation of predicates and arguments so that grammatical information produced by different parses of the claims 506 may be acted upon by the patent claim analysis system 102. The PAS instructions may also perform certain normalization procedures, such as changing passive voice into active voice, and simplifying representations by removing certain grammatical relations that are not central to processing of the claims 506.

In an illustrative example, the following claim may be found in a patent document:

1. A system comprising:
   a first widget having a cylindrical shaped body with an enclosed base and an open top; and
   a second widget having a porous membrane configured to partially cover the top of the first widget.

The POS or PAS performed by the claim praising engine may process the claim feature "a first widget having a cylindrical shaped body with an enclosed base and an open top", to identify "widget", "body", "base" and "top" as nouns, "first" as an adjective modifying the noun "widget", "cylindrical shaped" as an adjective modifying the noun "body", "enclosed" as an adjective modifying the noun "base", and "open" as an adjective modifying the noun "top". Similarly, the root predicate of the claim feature may be identified as "having", with "first widget" as the subject argument. The word "and" may also be tagged as a conjunction between the nouns "base" and "top". The claim parsing engine may also recognize that the terms "open top" and "top" can be co-referenced as referring to the same article.

Once the linguistic analysis results 510 associated with the claims 506 are produced and claim elements are identified, the patent claim analysis system 102 may perform claim profile generation 512 with respect to each of the claims 506 and/or documents of the collection of documents 502. The claim profiles 514 may include one or more of the claim limitations and/or claim metadata. In various implementations, the claim metadata may include one or more of word count, unique word count, unique word count with stemming, unique word count without stemming, unique word count with stop words removed, unique word count without stop words removal, limitation count, list of limitations, element count, list of elements, and so forth. A claim score number may also be calculated using the parse tree from the POS tagging. The claim score can be calculated by assigning each element a base limitation score where a low score is very broad and a high score is a narrow claim. The limitation scores can then be combined using the parse tree and known practices and rules of patent law. For instance, when the article of an element is "A", the element is new and can be given a full weight value, such as 1.0. If the article of an element is "The", the element is not new to the claim but is reciting additional limitations, so the element can be given a smaller weight, such as "0.1". Once the elements have weights, the connecting language can be used to combine the weights into a single claim score, such as via a tree traversal technique. For instance, element scores for a list of elements joined with "and" can be added together. Limitation scores for a list of elements joined with "or" can averaged, or the minimum weight taken, or other discount applied to reflect the broadening nature of the "or" conjunction. Likewise, a "wherein" clause that attaches to one element of the claim and makes the claim element narrower, can be re-applied anywhere the claim element is recited. By propagating the element scores up the tree and using modifiers based on different connecting language, a final claim score can be calculated for each claim based on the individual limitation scores for the claim elements. A broadest claim can be found in a patent, a patent family, or any other collections of patents by finding the minimum claim score for that collection. The words of the claims 506 may be tagged or labeled to assist the patent claim analysis system 102 in understanding the phrase structure. Using the tagged claims, the patent claim analysis system 102 may then generate claim profiles 514. An example claim profile for the example claim 1 above is illustrated in the following Table 1:

TABLE 1

| Claim Profile | |
|---|---|
| Patent ID Number | 999,999,999 |
| Claim | 1 |
| Claim Score | 13.75 |
| Word Count | 36 |
| Unique Word Count (w/stop words) | 18 |

TABLE 1-continued

| Claim Profile | |
|---|---|
| Limitation Count | 6 |
| Element List | A system; widget; a cylindrical shaped body enclosed base open top a second widget a porous membrane |
| Element Count | 4 |

Additionally, the claim score can be modified to be more accurate based on a frequency analysis of the claim element. This can be done using standard text methods, such as the term frequency or TF-IDF vectorization methods, or the frequency analysis can be performed using an embedding vector to find the claim element and any element substantially similar to the claim element using standard vector distance measures such as cosine similarity. Once a claim term's frequency is calculated, the claim can be further divided into pre-priority date frequency and post-priority date frequency. By comparing the pre-priority date frequency with the post-priority date frequency and the overall frequency within the corpus, a number of calculations can be made. The most simple measure is to use the claim element frequency within a CPC or similar patent classification grouping. An infrequently used term can be weighted higher than a frequently used term, such as weighting an element "RADAR" as a 1 because it is a commonly used in patents and an element such as "LIDAR" a 5 because LIDAR is less commonly used than RADAR. Once these weights have been assigned, the weights may be applied to the parse tree and the weights (e.g., limitation scores) bubble up to the top for a final claim score. For instance, if a claim recites "A RADAR and a LIDAR", the two element weights can be added together, such as adding a 1 to a 5 to get a final claim score of 6. If the claim recites "A RADAR or a LIDAR", the two elements can be combined by starting with the broadest term weight, in this case the element RADAR with a weight of 1, and subtracting the reciprocal of the narrower claim terms in the rest of the or clause, such as LIDAR with a weight of 5 and a reciprocal of ⅕, for a final claim score of 4.8. Thus, the "or" clause claim has a slightly broader claim score than the "and" clause claim. By repeating this process at every node in the parse tree, a final frequency weighted claim score can be determined.

After each claim 506 is processed to generate the claim profiles 514, the patent claim analysis system 102 may perform peer group claim set profile generation 516 that aggregates the individual claim profiles 514. The resulting peer group claim set profile 518 may include a peer group identification, a number of patent documents contributing to the peer group claim set profile, a total number of independent claims within the claim set profile, a full size of the vocabulary used by the identified claims within the peer group patent documents, an average claim size; a median claim size, a number of unique limitations in peer group claim set profile 518 or the peer group collection of documents, a list of unique limitations of claims within the peer group claim set profile 518, a frequency of occurrence of the claim limitations (or the unique claim limitation) within the claims of the peer group claim set profile 518, a list of unique elements within the peer group claim set profile 518, and/or a frequency of occurrence of the claim elements (or the unequip claim elements) within claims of the peer group claim set profile 518. In addition, thresholds defining subsets of claim metrics may be measured relative to the other claims, for example, whether a certain metric places a claim 506 into the upper quartile, or middle third, or lowest 10%. It should be understood that any number of thresholds may be articulated or included in the claim metrics and that each metric may be evaluated with respect to a framework of thresholds. The framework of thresholds may indicate multiple thresholds that each indicate different groupings for a claim or claim element based on the value of a metric. Table 2, below, illustrates an example peer group claim set profile that includes example frameworks of thresholds:

TABLE 2

Peer Group Claim Set Profile

| | |
|---|---|
| Peer Group | A32 |
| Total Patents | 8,328 |
| Total Independent Claims | 24,981 |
| Vocabulary Size measured by Unique Words | 345,837 unique words |
| Average claim size | 73 unique words |
| Median claim size | 59 unique words |
| Zone Thresholds | AB - 32 unique words; BC - 59 unique words; CD - 89 unique words; DE - 107 unique words |
| Total Unique Limitations | 320,872 limitations; |
| Average Limitations | 65 limitations |
| Median Limitations | 57 limitations |
| Zone Thresholds | AB - 15 limitations; BC - 36 limitations; CD - 64 limitations; DE - 82 limitations |
| List of Unique Limitations and frequency counts | system (128,028); method (117,382); . . . widget (782); . . . cylindrical shaped body (83); |
| Total Unique Elements | 84,124 |
| Average elements | 17 elements |
| Median elements | 14 elements |
| Zone Thresholds | AB - 4 elements; BC - 9 elements; CD - 17 elements; DE - 23 elements |
| List of Unique Elements and frequency counts | . . . ; first widget having a cylindrical shaped body (7); . . . |

The peer group claim set profile 518 may be expanded to include other data and analysis results (such as the linguistic analysis results 510). For instance, words in the vocabulary may be analyzed for synonyms to identify limitations that may be similar. To illustrate, the patent claim analysis system 102 may determine that the word widget is equivalent to "gizmo" and that the word "gizmo" is also equivalent to the word "thing". Thus, in this example, the patent claim analysis system 102 may determine that first widget is approximate to first gizmo or the first thing. The patent claim analysis system 102 may also create aggregate lists of modifying and/or limiting terms. For instance, the patent claim analysis system 102 may determine that widget is a noun and first, second, round, flat, large, big, colored, etc. are adjectives associated with the noun widget. Additional relational records/charts may be developed and included in the claim set peer group profile 518 to add additional insights into the claim language.

The patent claim analysis system 102 may perform claim set peer group profile evaluation 520 in which the claims 506 of the peer group claim set profile 518 may be evaluated against the other claims within the peer group claim set profile 518. For instance, individual claims 506 of the peer group claim set profile 518 may be compared to various thresholds of metrics determined based on the performance of the peer group claim set profile 518. In one example, a first claim may score an A in size, a B in limitations, and A in elements when compared with the thresholds. The resulting claim score ABA, may then be compared to scores of other claims in the claim set peer group profile 518 to determine that the first claim ranks in the top X % of the peer group claim set profile 518. In this manner, claims of a peer group 518 can be relatively ranked again based on a cleaner understanding of the language, as defined by claim limitations and claim elements within the peer group claim set profile 518.

The ratings of claim set profiles within a peer group may be used to evaluate risk of the individual patents or the peer group itself. In particular implementations, ratings of the peer group claim set profiles may be used to evaluate validity of the claims or claim sets. In certain implementations, a peer group may receive a claim set peer group rating 522 based on the performance of the individual claims 506 or patents within the peer group. The claim set peer group rating 522 may be used to assist with valuation, sale, insuring, and/or trading of the entire portfolio. The patent claim analysis system 102 may also evaluate limitations in view of the non-claims portion of a patent document of the collection (e.g., detailed description, background, abstract, summary, etc.), map limitations to product features, determine an age of a patent, claim, or peer group, as well as other metrics. In particular implementations, the patent claim analysis system 102 may utilize the specification and age as well as the claim analysis to identify unclaimed subject matter within the peer group or to rate claimed or unclaimed subject matter within the peer group claim set profile 518. To illustrate, claim set peer group ratings 522 may be used to assist with identifying subject matter of a patent that, if claimed, would have high monetary value or would be likely to be infringed.

FIGS. 6-10 are flow diagrams illustrating example processes associated with analyzing claims and generating claim analysis reports according to some implementations. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

Figure 6:
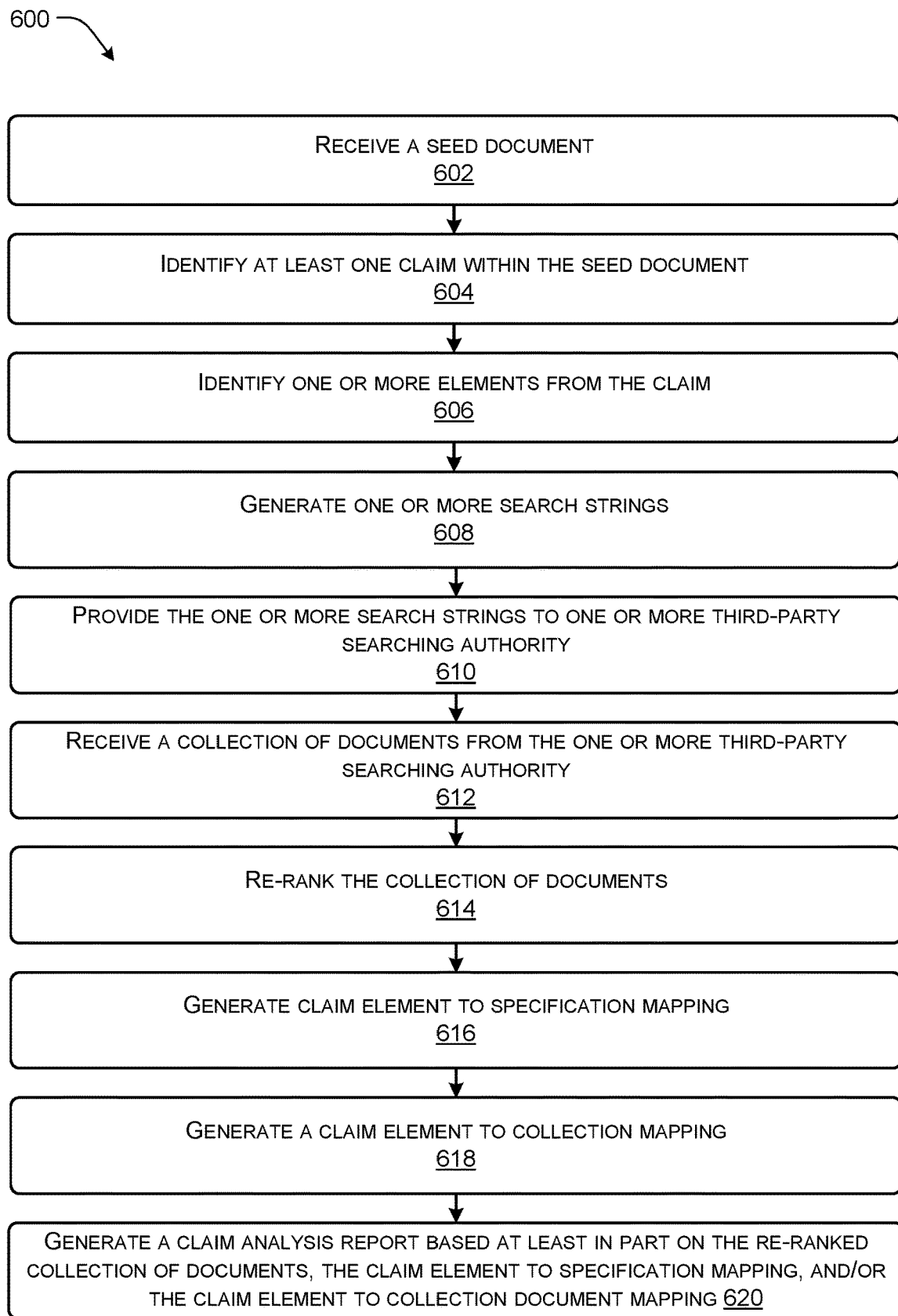
FIG. 6 illustrates an example flow diagram showing a process for generating a claim analysis report according to some implementations.

FIG. 6 illustrates an example flow diagram showing a process 600 for generating a claim analysis report according to some implementations. As discussed above, the patent claim analysis system 102 may be configured to generate claim analysis reports from an initial patent, claim, or seed document. The claim analysis reports may be used, in some cases, to assists in the evaluation of relative breadth of a claim of the patent or seed document as compared to other claims within a collection of patents or documents in a technology area.

At 602, the patent claim analysis system 102 may receive a seed document. The seed document may be a patent or other content including at least one claim (e.g., a claim chart, an infringement demand letter, etc.). The seed document may be a collection of documents or one or more documents (e.g., a group or portfolio of patents).

At 604, the patent claim analysis system 102 may identify at least one claim within the seed document. For example, the patent claim analysis system 102 may identify the claims and/or the content associated with the claims via document labels or identifiers within the seed document. To illustrate, the portion of a seed document that includes the claims may have a title or section header (such as in a patent document) that identifies the portion of content as claims separate from other portions of the seed document. In additional implementations, other recognition techniques may, alternatively or additionally, be applied to identify the claims of the seed document. In illustrative examples, the patent claim analysis system 102 may parse the content of the seed document claim language using a parsing engine. The patent claim analysis system 102 may then distinguish the claims from the reminder of the content of the seed document based on the linguistic analysis results produced by the parsing engine as the claims have a distinct structure when compared with other content included in various documents.

At 606, the patent claim analysis system 102 may identify one or more elements from the claim. For example, the patent claim analysis system 102 may include a claim parsing engine that may be executed to analyze the claim language and produce a set of linguistic analysis results including a syntactic parse of one or more claims that provides information pertaining to sentence structure, parts of speech, relationships between parts of speech, and the like. The patent claim analysis system 102 may also label or tag various words or combinations of words within the claims. That is, some words may be tagged as nouns, other words as verbs, and still other words as adjectives or adverbs. Words having relationships with each other may also be tagged, such as an adjective that modifies a noun may be labeled in relation to that noun or an adverb that modifies a verb may be labeled in relation to the verb.

The linguistic analysis may be utilized to determine elements of the claim. To illustrate, the patent claim analysis system 102 may compare the results of the linguistic analysis to one or more predetermined criteria related to claim elements. In certain implementations, limitations of a claim may be identified and an element of the claim may be comprised of a number of limitations. In particular implementations, a limitation may include a word or phrase that conveys a singular concept, such as nouns, noun and adjective couplings, verbs, and/or verb and adverb couplings. An element may then be identified by combining a number of elements. Predicate-argument combinations may also be used to identify claim elements.

At 608, the patent claim analysis system 102 may generate one or more search strings. The one or more search strings may be comprised of one or more words of the claim. In certain implementations, the one or more search strings may be comprised of at least a portion of the one or more elements of a claim. In various implementations, the patent claim analysis system 102 may utilize a frequency of occurrence of the claim elements from the non-claim content of the seed document to select the one or more search strings. For instance, the patent claim analysis system 102 may select the 5, 10, 15, 20 (or other predetermined number) of most used claim elements in the non-claim content as the one or more search strings. In yet another example, the patent claim analysis system 102 may generate a claim set peer group, as discussed above with respect to FIG. 5, based on the identified claims and the seed document or documents, and then select claim elements having a rating above a predetermined threshold, claim elements from claims having a rating above a predetermined threshold from claims, claim elements within a top predetermined threshold (such as 50%, 25%, or 10%, etc.) within the peer group, and/or claim elements from claims within a top predetermined threshold (such as 50%, 25%, or 10%, etc.) within the peer group as the one or more search strings. In illustrative examples, the patent claim analysis system 102 may also provide the search strings to an individual for human editing.

In additional implementations, the patent claim analysis system 102 may identify a set of narrowest claim elements either from the independent claims or the dependent claims to include in the one or more search strings. The patent claim analysis system 102 may identify the narrowest claim elements based on a frequency of occurrence of each claim element within a corpus of related documents. The patent claim analysis system 102 may determine a measure of narrowness of a claim element based on a frequency of occurrence in words of the claim element in one or more sets of patent documents. For example, a narrowness of a word in a claim element may be based on a frequency of usage of the word in documents filed before the seed document and a frequency of usage of the word in documents filed after the seed document. That is, words having a relatively low frequency of usage before the filing date of the seed document and a relatively high frequency of usage after the filing date of the seed document may be identified as relatively narrow words. In particular implementations, the patent claim analysis system 102 may set a first threshold number of occurrences of words that indicates a relatively low frequency of usage for words and a second threshold number of occurrences that indicates a relatively high frequency of usage. In this way, the patent claim analysis system 102 may evaluate the frequency of occurrence of words included in the claim element with respect to the first threshold and the second threshold to determine a measure of narrowness of the words and then rank the words according to their respective measures of narrowness. The patent claim analysis system 102 may then identify the claim elements or words of the claim elements having the lowest frequency of occurrence within one or more corpuses of related documents and utilize the claim elements or words of the claim elements to generate the one or more search strings.

In certain implementations, the patent claim analysis system 102 may generate the one or more search strings from words that are related to words included in the claim elements. The words related to the claim element words may be identified in other portions of the seed document (e.g., summary, background, brief description of drawings, detailed description of drawings, abstract, etc.), content from other seed documents, as well as other documents related to the seed documents. In some cases, the one or more search strings may be generated by applying an n-gram technique to the claim elements. An n-gram may be a contiguous sequence of n items from a given sample of text or speech. The items can be phonemes, syllables, letters, words or base pairs according to the application. In some specialized fields, such as patent law, as claim elements often have patent specific grammar and wording, the patent claim analysis system 102 may convert or generate plain English alternatives for words of the claim elements to include in the one or more search strings that may be more common inputs for certain third-party searching authorities.

At 610, the patent claim analysis system 102 may provide the one or more search strings to one or more third-party searching authorities. The third-party searching authorities may include or otherwise be in communication with various data repositories or platforms available, such as government databases, private databases (such as patent or intellectual property databases), public search engines, ecommerce platforms, among others. At 612, the patent claim analysis system 102 may receive a collection of documents as results of searches performed using the one or more search strings from the one or more third-party searching authorities. The collection of documents or content may include patent documents (e.g., patents, patent applications, office action response, etc.), legal documents (e.g., briefs, case law, demand letters, legal opinions, etc.), technical documents (e.g., product specifications, product manuals), marketing documents (e.g., advertisements, brochures, flyers, etc.), sales documents (purchase orders, product listings, etc.), product performance or review documents (e.g., editorial reviews, customer reviews, product tear down reports or videos, etc.), among others.

At 614, the patent claim analysis system 102 may re-rank the collection of documents received from the one or more third-party searching authorities. Each searching authority may return the documents in an order of importance as determined according to the searching authority's procedures and processes. However, the order of importance or ranking generated by the third-party searching authority often differs from the order of importance of one skilled in the field of intellectual property, as the third-party searching authorities are not typically designed for patent infringement or invalidity searching. Thus, the patent claim analysis system 102 may re-rank the collection of documents to better correspond to the order imparted by one skilled in the field of intellectual property.

In illustrative examples, the patent claim analysis system 102 may generate a claim term hit frequency with respect to claims or claim elements from the seed document in relation to the frequency of the terms of the claims or claim elements in the collection of documents. In these examples, the patent claim analysis system 102 may then re-rank documents from the collection higher if documents have a higher hit frequency of the terms of the claims or claim elements of the seed document than other documents in the collection of documents. In additional examples, the patent claim analysis system 102 may compare the frequency of words of the non-claim portions of the seed document with the frequency of words in the documents of the collection that were returned from the third-party searching authority. For instance, similarity between the usage frequency of words in the specification of the seed document in relation to frequency of usage of the words in the collection of documents may indicate a higher level of relevancy than other documents having a lower degree of similarity.

The patent claim analysis system 102 may re-rank the documents of the collection based on patent specific metrics. For example, the collection of documents may be ranked based on an age of the individual documents of the collection or a date of the individual documents of the collection, such as a filing date, a publication date, or a date of issuance. For instance, older documents included in the collection that contain content directed to the search terms are more likely to be relevant to an invalidation search and, thus, may be ranked more highly compared to newer documents. In additional scenarios, such as searching for documents as part of an infringement search, the older documents are less likely to correspond to infringing products. That is, documents included in the collection having dates of filing, publication, and/or issuance that predate the filing, publication, and/or issuance dates of the seed document are less likely to correspond to a product that may infringe claims of the seed document. In these instances, more recent documents included in the collection may be ranked higher than the older documents within the collection. In other examples, the patent claim analysis system 102 may re-rank the collection of documents based at least in part on specification length, number of claims, length of independent claims, number of drawings, patent office art units, number of documents cited or reviewed during examination of the document or patent, events occurring during examination, etc.

In additional illustrative examples, the patent claim analysis system 102 may identify the narrowest claim element (for instance based on lowest frequency of occurrence of one or more words or phrases of the claim element in a corpus of related documents) either from the independent claims or the dependent claims of the seed document. The patent claim analysis system 102 may then re-rank the documents of the collection of documents based on a frequency of occurrence of one or more words or phrases included in the narrowest claim element within each document of the collection of documents.

In one specific implementation, the patent claim analysis system 102 may re-rank the documents within the collection using a term frequency-inverse document frequency (TF-IDF) technique. Term frequency-inverse document frequency is a numerical statistic that is intended to reflect how important a word or term is to a particular document in a collection or corpus. Term frequency-inverse document frequency may be used herein as a weighting factor to assist with ranking the documents within the collection based on the claim elements of the seed document or the one or more search strings. The term frequency-inverse document frequency technique may increase the value of a term proportionally to the number of times a word appears in a document of the collection and is offset by the number of documents in the collection that contain the word, which helps to adjust for the fact that some words appear more frequently in general.

At 616, the patent claim analysis system 102 may generate claim element to specification mappings. Generating the claim element to specification mapping may first include identifying usage of claim elements within the specification and/or identification of terms substantially similar to or used as an alternative to the claim element within the specification. The patent claim analysis system 102 may then generate the claim element to specification mapping that includes potential definitions of the claim element, potential limiting features of the claim element, potential examples related to the claim element, etc. The claim element to specification mapping may also include citations to the specification in which the claim element is used or defined (e.g., paragraph number, page number, specification text, etc.).

At 618, the patent claim analysis system 102 may generate claim element to collection mapping. The collection mapping may include identifying usage of words of a claim element of the seed document within the content of collection of documents. Additionally, claim element to collection mapping may include identification of terms substantially similar to those used in the claims of the seed document that are also included in the collection of documents. In further examples, the claim element to collection mapping may include identifying words and/or phrases that may be used as an alternative to the terms included claim element within the content of collection of documents. The collection mapping may also include citations to the individual documents in which the claim element is used (e.g., document number, paragraph number, page number, etc.).

At 620, the patent claim analysis system 102 may generate one or more claim analysis reports based at least in part on the re-ranked collection of documents, the claim element to specification mapping, and/or the claim element to collection mapping. The one or more claim analysis reports may include a claim validity or invalidity analysis, patent valuation estimations, claim ranking reports, as well as other mappings, charts, or reports usable by experts in the field. In additional examples, the one or more claim analysis reports may include a claim chart that maps one or more features of at least one claim of the seed document to one or more features of a product.

Figure 7:
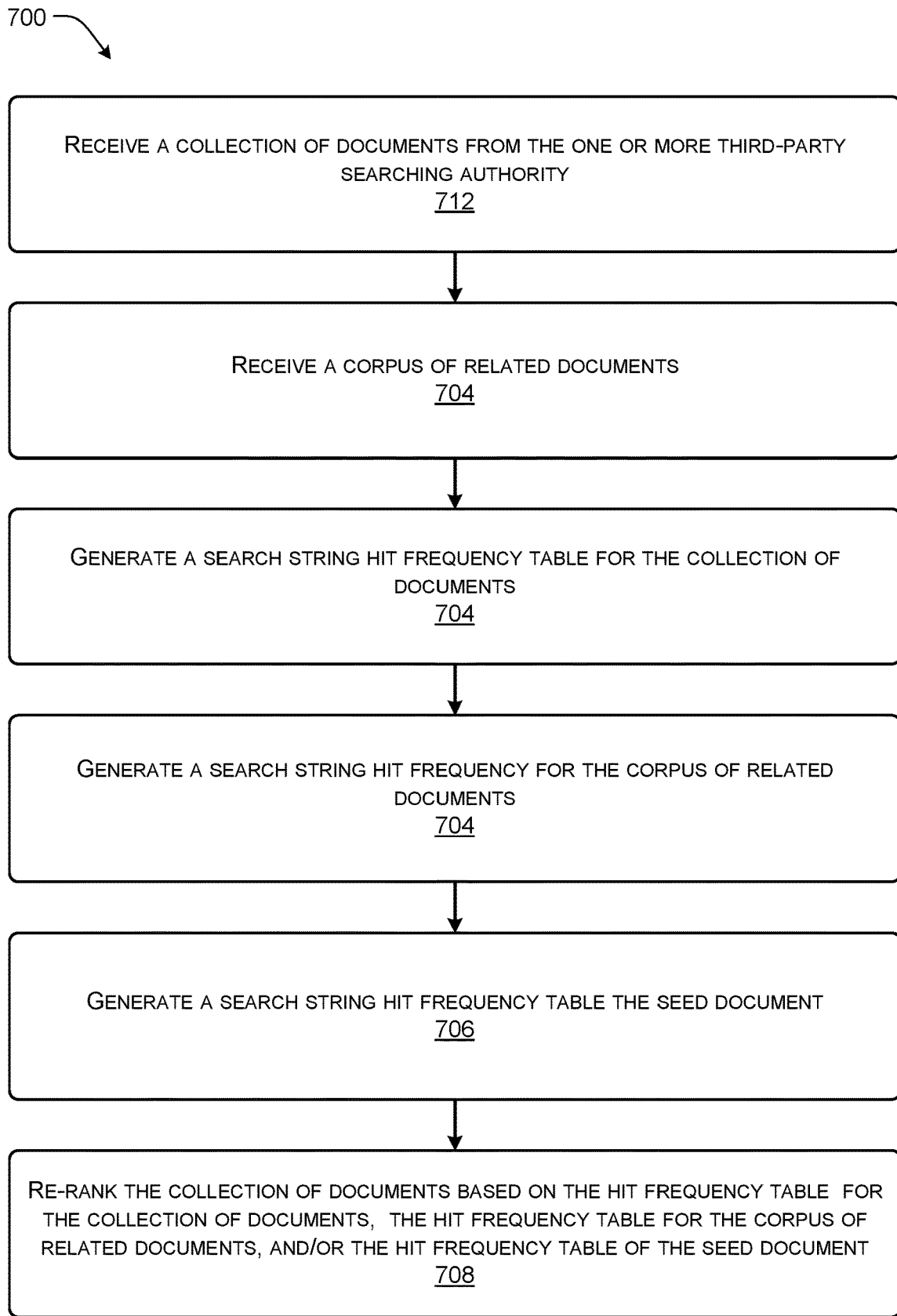
FIG. 7 illustrates an example flow diagram showing a process for re-ranking documents according to some implementations.

FIG. 7 illustrates an example flow diagram showing a process 700 for re-ranking documents according to some implementations. As discussed above with respect to step 614 of FIG. 6, the documents received from the searching authority are in an order of importance as determined according to the searching authority's procedures and processes. However, the order of importance or ranking generated by the third-party searching authority often differs from the order of importance of one skilled in the field of intellectual property, as the third-party searching authorities are not typically designed to identify documents based on criteria related to patent infringement or invalidity analyses. Thus, the patent claim analysis system 102 may re-rank the collection of documents to better mirror the order imparted by one skilled in the field of intellectual property and the process 700 provides an example process for re-ranking of the documents in a collection of documents that may be a subprocess performed as part of step 614 of the process 600.

At 702, the patent claim analysis system 102 may receive a collection of documents from the one or more third-party searching authorities. As discussed above, in some cases, the documents or content may include patent documents (e.g., patents, patent applications, office action response, etc.), legal documents (e.g., briefs, case law, demand letters, legal opinions, etc.), technical documents (e.g., product specifications, product manuals), marketing documents (e.g., advertisements, brochures, flyers, etc.), sales documents (purchase orders, product listings, etc.), product performance or review documents (e.g., editorial reviews, customer reviews, product tear down reports or videos, etc.), among others.

At 704, the patent claim analysis system 102 may receive a corpus of related documents. The corpus of related documents may be received as part of the seed documents. The corpus of related documents may also be pre-selected by an expert in the field of intellectual property. Additionally, the patent claim analysis system 102 may generate or select the corpus of related documents. To illustrate, the patent claim analysis system 102 may utilize one or more classifications of patent documents to identify a group of patent documents and the select at least a portion of the patent documents in the group that are related to one or more claims of a seed document to obtain the corpus of related documents. In various implementations, at least a portion of the corpus of related documents may be different from at least a portion of the documents included in the collection of documents.

At 706, the patent claim analysis system 102 may generate a hit frequency table for the collection of documents. The hit frequency table may include a frequency of occurrence of each search string in each document of the collection of documents. In addition, at 708, the patent claim analysis system 102 may generate a hit frequency table for the corpus of related documents. The hit frequency table for the corpus of related documents may include a frequency of occurrence of each search string in each document of the corpus of related documents. Further, at 710, the patent claim analysis system 102 may generate a hit frequency table for the seed document(s). The hit frequency table for the seed document may include a frequency of occurrence of each search string in the non-claim content of the seed document(s), such as the detailed description of the seed document(s).

At 712, the patent claim analysis system 102 may re-rank the collection of documents based on the hit frequency table for the collection of documents, the hit frequency table for the corpus of related documents, and/or the hit frequency table for the seed document. For instance, similarity between the usage frequency of search terms in the seed document or the corpus of related documents (as the documents are already determined to be related to the claim or claim elements) and usage frequency of the search term in a document of the collection of documents may indicate a higher level of relevancy than another document having a lower similarity between the hit frequencies.

Figure 8:
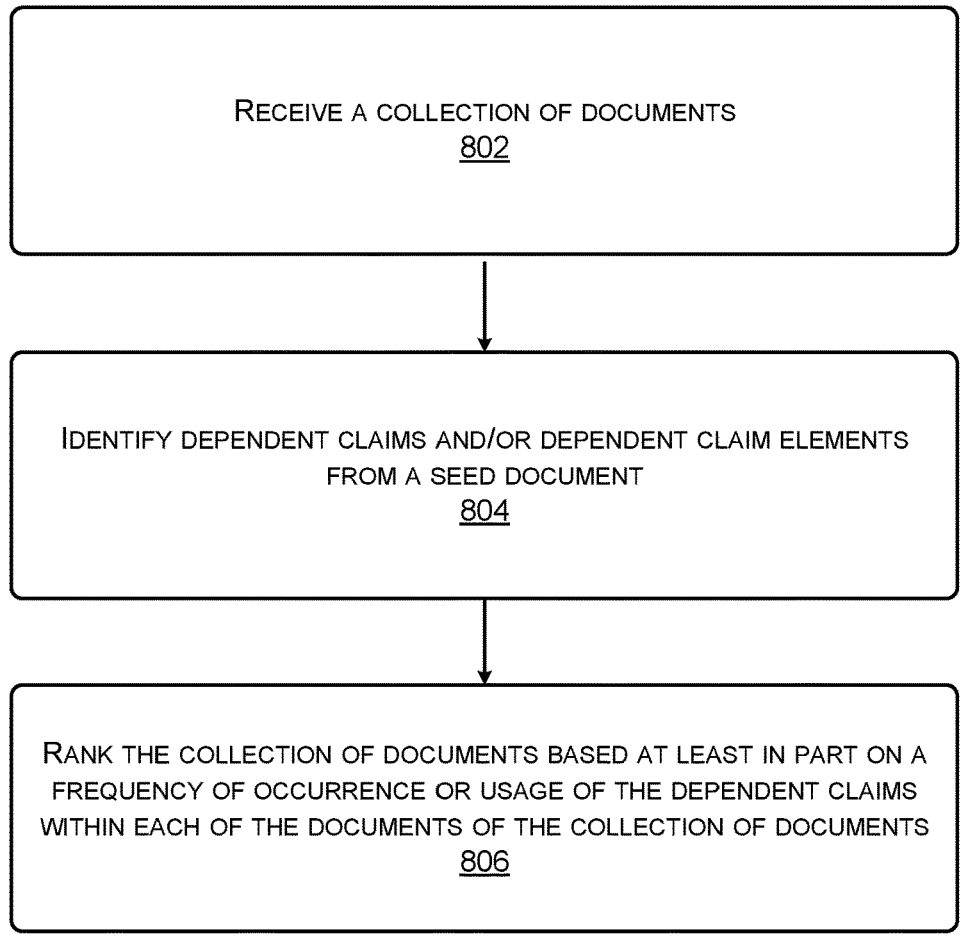
FIG. 8 illustrates another example flow diagram showing an additional process for ranking documents according to some implementations.

FIG. 8 illustrates another example flow diagram showing a process 800 for re-ranking documents according to some implementations. As discussed above with respect to step 614 of FIG. 6, the documents received from the searching authority are in an order of importance as determined according to the searching authority's procedures and processes, which often differs from the order of importance of one skilled in the field of intellectual property. The process 800 provides another example for re-ranking of the documents in a collection of documents that may be a subprocess performed as part of step 614 of the process 600.

At 802, the patent claim analysis system 102 may receive a collection of documents from the one or more third-party searching authorities. As discussed above, in certain implementations, the documents or content may include patent documents (e.g., patents, patent applications, office action response, etc.), legal documents (e.g., briefs, case law, demand letters, legal opinions, etc.), technical documents (e.g., product specifications, product manuals), marketing documents (e.g., advertisements, brochures, flyers, etc.), sales documents (purchase orders, product listings, etc.), product performance or review documents (e.g., editorial reviews, customer reviews, product tear down reports or videos, etc.), among others.

At 804, the patent claim analysis system 102 may identify dependent claims and/or dependent claim elements from the claims of the seed document. For example, the dependent claims may be identified based on preamble detection that is capable of detecting the presence of a preamble in document content. In the context of patent claims, a preamble recites the class of the invention, and optionally its primary properties, purpose, or field. In dependent claims, the preamble references another claim and refines it, e.g., "the method of claim 1 . . . ". The body of a patent claim includes the clauses that provide limitations of the claim. In various implementations, the preamble detection may be performed by automatic document analysis that processes the text of claims to determine that a claim includes a preamble of a dependent claim (e.g., the claim includes a reference back to a preceding claim) and, consequently, determine that the claim is a dependent claim.

At 806, the patent claim analysis system 102 may re-rank the collection of documents based at least in part on the frequency of occurrence of usage of one or more words and/or phrases of the dependent claims within each of the documents of the collection of documents. In particular implementations, the frequency of occurrence may be based on usage of specific features of the dependent claims or portions of the text of the dependent claims (such as nouns, sentence parts, or parts of speech, etc.). The documents having a higher usage or frequency of occurrence of the dependent claims are more likely to be highly relevant to the seed document, as the dependent claims are typically narrower or more specific than the independent claims.

Figure 9:
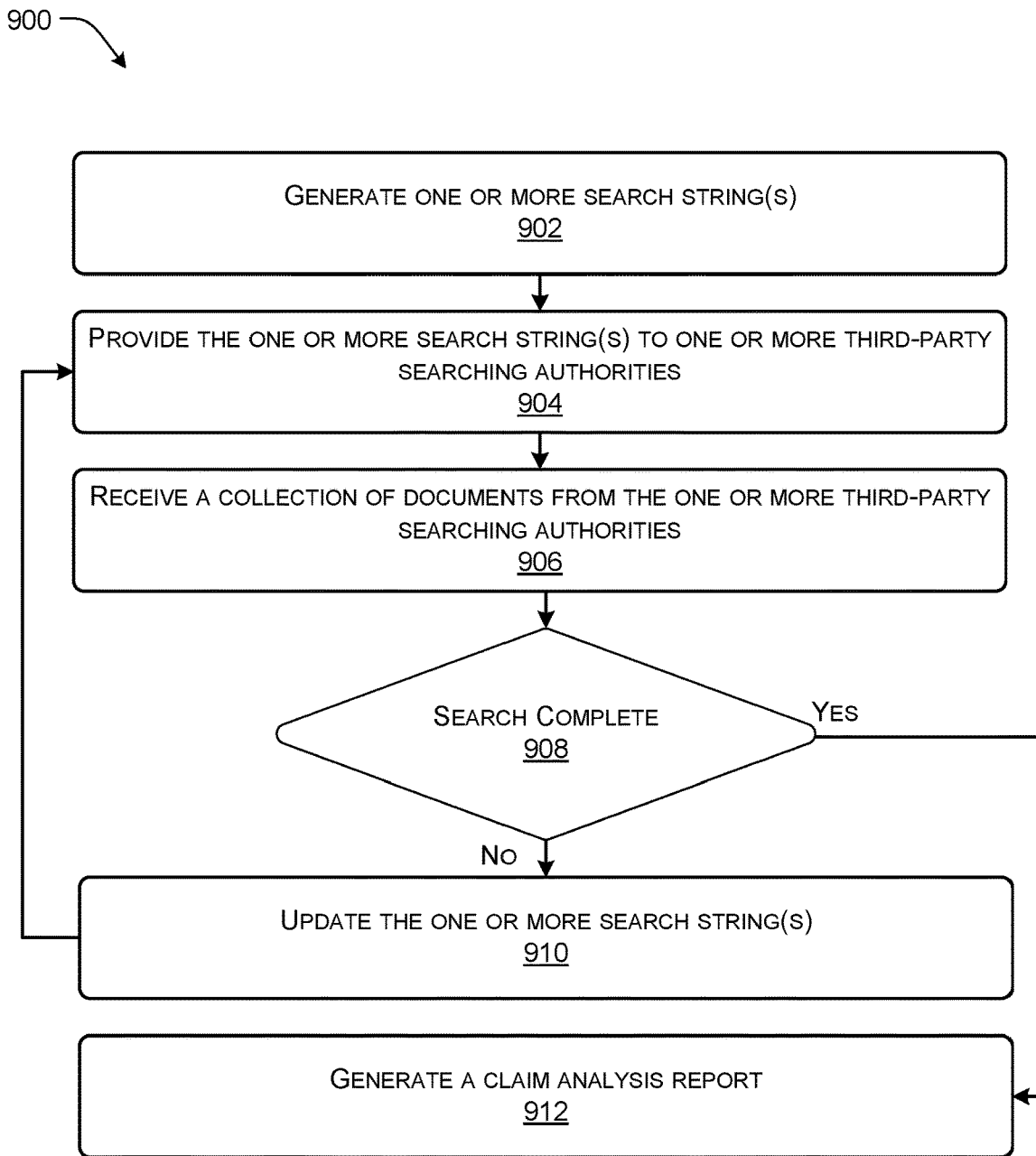
FIG. 9 illustrates an example flow diagram showing a process for generating one or more search strings according to some implementations.

FIG. 9 illustrates an example flow diagram showing a process 900 for generating one or more search strings according to some implementations. The patent claim analysis system 102 may provide a one or more search strings to a third-party searching authority to generate a collection of documents relevant to one or more claims of a seed document. The patent claim analysis system 102 may update or refine the one or more search strings based on the original collection of documents received from the third-party searching authority. For instance, the collection of documents may be analyzed to generate additional search strings relevant to the claims of the seed document. In an illustrative example, a user manual for a product returned by the third-party searching authority may be written in a manner such that an individual having a $5^{th}$ grade reading level can understand a relatively complex product or machine. Continuing with this example, the user manual may have content or text that is closer to a plain English version of a search query the third-party searching authority typically processes than the language of a patent document or claim. Thus, using search strings using words from the user manual may return documents or results that are relevant to the one or more initial search strings but would not be returned when the search strings are derived from patent documents.

At 902, the patent claim analysis system 102 may generate one or more search strings. The one or more search strings may be an initial corpus of search strings based on at least a portion of one or more claim elements included in a seed document. In addition, at 904, the patent claim analysis system 102 may provide the one or more search strings to one or more third-party searching authorities and, at 906, the patent claim analysis system 102 may receive a collection of documents from the one or more third-party searching authorities. In some cases, the documents or content may include patent documents (e.g., patents, patent applications, office action response, etc.), legal documents (e.g., briefs, case law, demand letters, legal opinions, etc.), technical documents (e.g., product specifications, product manuals), marketing documents (e.g., advertisements, brochures, flyers, etc.), sales documents (purchase orders, product listings, etc.), product performance or review documents (e.g., editorial reviews, customer reviews, product tear down reports or videos, etc.), among others.

At 908, the patent claim analysis system 102 may determine whether the search using the one or more search strings is complete. For example, the patent claim analysis system 102 may re-run a search using the one or more search strings with one or more of the one or more third-party searching authorities for a predetermined number of iterations, such that when the predetermined number is reached or exceeded, the process 900 proceeds to 912. In additional examples, the process 900 may advance to 910 and update the one or more search strings. In particular implementations, the search may not be complete until a predetermined level of relevancy between the seed document and the collection of documents returned by the search is achieved. In still other examples, the patent claim analysis system 102 may continue to update the one or more search strings until a number of words and/or phrases of claim elements included in the seed document are found within a predetermined number of documents within the collection of documents.

At 910, the patent claim analysis system 102 may update or refine the one or more search strings. In illustrative examples, the patent claim analysis system 102 may generate a frequency of occurrence of each of the search terms and/or claim elements within each of the documents of the collection of documents. The patent claim analysis system 102 may then prune or remove search strings that have one or more terms with a frequency of occurrence below a threshold frequency. For instance, low occurrence of terms included in a search string within the collection of documents may imply the search term is not well used in the industry and, thus, will not return useful results when provided to a third-party searching authority.

In additional implementations, the patent claim analysis system 102 may then prune or remove search strings having one or more terms with a frequency of occurrence greater than an additional threshold frequency. For example, search strings having one or more search terms with a relatively high frequency of return are more likely to be less relevant to the novelty or unique elements of a claim and, thus, may result in documents being returned in the collection of documents in response to the one or more search strings that are less relevant to the seed document. Thus, by removing or pruning search strings with terms that have a high frequency of occurrence, the third-party searching authorities are more likely to return documents that are more relevant when the second or next follow up search is performed. In various implementations, the thresholds applied may be based on the type of analysis being performed (e.g., invalidation v. infringement).

Further, the documents included in the collection of documents may be divided into groups. For example, a first group may include documents having a date prior to the priority date of the seed document and a second group may include documents having a date after or following the priority date of the seed document. In these situations, one or more terms of each search string may have a first frequency of occurrence associated with the documents in the first group and a second frequency of occurrence associated with the documents in the second group. In particular implementations, search terms may be removed from the one or more search strings when a search string has a first frequency of occurrence less than a first threshold and a second frequency of occurrence greater than a second threshold frequency. Continuing with this example, a low usage rate prior to the date of the seed document and a high usage rate after the date of the seed document may indicate documents related to products having potential infringement of the claims of the seed document. In additional implementations, search terms may be removed from the one or more search strings when the search string has a first frequency of occurrence greater than the first threshold and a second frequency of occurrence less than the second threshold frequency. In these instances, a high usage rate prior to the date of the seed document and a low usage rate after the date of the seed document may indicate that one or more claims of the seed document may be invalid.

The patent claim analysis system 102 may utilize one or more terms of claims or claim elements from the seed document to update or refine the one or more search strings. For example, the patent claim analysis system 102 may determine frequency of occurrence of each term or claim element within each document of the collection of documents. The patent claim analysis system 102 may then utilize documents having a high frequency of occurrence of terms of the claims or claim elements to generate one or more updated search strings. To illustrate, if a particular document of the collection of documents has a high frequency of each of the terms included in the one or more initial search strings, the particular document may be highly relevant to the seed document or the claims of the seed document. In these scenarios, as the particular document may be a non-patent or non-legal document (such as a technical document or marketing document), the search terms generated using words or phrases from this document may be more suited for and return better results when submitted to third-party searching authorities than search strings generated from patent or legal documents.

At 912, the patent claim analysis system 102 may generate a claim analysis report based at least in part on a re-ranked collection of documents, a claim element to specification mapping, and/or a claim element to collection mapping. In some cases, the claim analysis report may include a claim chart, a claim validity or invalidity analysis, patent valuation estimations, claim ranking reports, as well as other mappings, charts, or reports usable by experts in the field.

Figure 10:
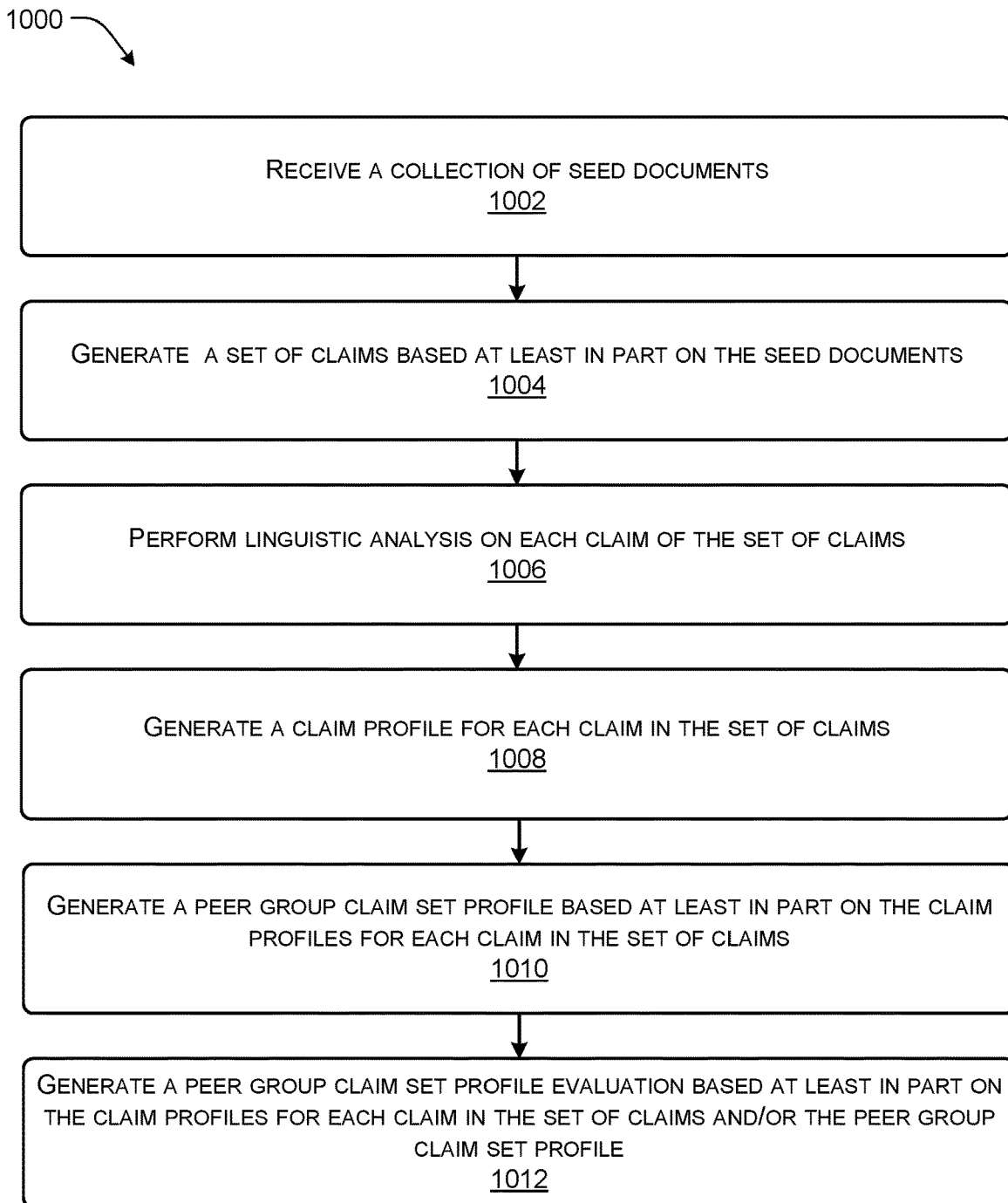
FIG. 10 illustrates an example flow diagram showing a process for generating f profile for a peer group of documents according to some implementations.

FIG. 10 illustrates an example flow diagram showing a process 1000 for determining metrics related to patents and groups of patents according to some implementations. At 1002, the patent claim analysis system 102 may receive a collection of seed documents. The collection of seed documents may be a group of related patents (such as a patent portfolio of an entity, a subset of a patent portfolio of an entity, a set of patents in the same art unit, a group of patents being evaluated for acquisition, etc.). In addition, at 1004, the patent claim analysis system 102 may identify a set of claims based at least in part on the seed documents. For example, for each document of the collection of seed documents, the patent claim analysis system 102 may perform claim identification to initially identify claims contained within the collection. In some cases, independent claims may be distinguished from the dependent claims, such that the set of claims only includes independent claims.

At 1006, the patent claim analysis system 102 may perform linguistic analysis on each claim of the set of claims. In various implementations, the patent claim analysis system 102 may parse the claim language using a claim parsing engine. The claim parsing engine may perform syntactical analysis to identify one or more of sentence structure, POS tagging, PAS, entity type assignment and/or co-reference chains. Potentially, multiple sets of linguistic analysis results may be produced by the claim parsing engine to help account for possible ambiguities in the terms of the claims.

In particular implementations, the claim parsing engine may be executed to analyze claim terms and produce a set of linguistic analysis results including a syntactic parse (e.g., a claim structure diagram) that provides information pertaining to sentence structure. In certain implementations, the claim parsing engine may be configured to include a linguistic analyzer for NLP. For instance, the linguistic analyzer may break claims into digestible segments, such as words, phrases, or other definable text-strings. The linguistic analyzer may have a set of NLP components that perform various language or linguistic analyses on text strings associated with the claims. A syntactic parser identifies the POS of words and the grammatical relationships between the POS of the words in a sentence. In illustrative implementations, the syntactic parser may be implemented in part based on the Stanford CoreNLP package for syntactic parsing. The linguistic analyzer may also include a PAS module that produces a parser-neutral representation of predicates and instantiated arguments of the parser-neutral representation of predicates. The PAS module may transform a parser-specific representation of grammatical relations to a common representation of predicates and arguments so that grammatical information produced by different parsers may utilized by the patent claim analysis system 102. In the process, the PAS module may also perform certain normalization procedures, such as changing passive voice into active voice, and simplify representations of the claims by removing certain grammatical relations that are not central to processing of the claims.

At 1008, the patent claim analysis system 102 may generate a claim profile for each claim in the set of claims. The claim profiles may include various types of claim metadata. For example, the claim metadata may include word count, unique word count, unique word count with stemming, unique word count without stemming, unique word count with stop words removal, unique word count without stop words removal, limitation count, list of limitations, element count, list of elements, combinations thereof, and the like. In particular implementations, the words of the claims may be tagged or labeled to assist the patent claim analysis system 102 in understanding the phrase structure. Using the tagged claims, the patent claim analysis system 102 may then generate claim profiles.

Additionally, at 1010, the patent claim analysis system 102 may generate a peer group claim set profile based at least in part on the claim profile for each claim in the set of claims. For instance, the patent claim analysis system 102 may aggregate the individual claim profiles into the peer group claim set profile. The peer group claim set profile may include a peer group identification, a number of patent documents contributing to the peer group claim set profile, a total number of independent claims within the claim set profile, a full size of the vocabulary used by the identified claims within the peer group patent documents, an average claim size, a median claim size, a number of unique limitations in peer group claim set profile or the peer group collection of documents, a list of unique limitations of claims within the peer group claim set profile, a frequency of occurrence of the claim limitations (or the unique claim limitation) within the claims of the peer group claim set profile, a list of unique elements within the peer group claim set profile, and/or a frequency of occurrence of the claim elements (or the unequip claim elements) within claims of the peer group claim set profile. In addition, thresholds defining subsets of claim metrics may be measured relative to the other claims, for example, whether a certain metric places a claim into the upper quartile, or middle third, or lowest 10% may be included in the peer group claim set profile. It should be understood that any number of thresholds may be articulated or include in the claim metrics. In illustrative examples, the peer group claim set profile may be expanded to include other data and analysis results (such as the linguistic analysis results), relational records/charts may be developed and included in the claim set peer group profile to add additional insights into the claim language.

Further, at 1012, the patent claim analysis system 102 may generate a peer group profile evaluation based at least in part on the claim profiles for each claim in the set of claims and/or the peer group claim set profile. For example, the claims associated with the peer group claim set profile may be evaluated against the other claims and/or various thresholds. In illustrative examples, individual claims of the peer group claim set profile may be compared to various predetermined threshold metrics. In one example, a first claim may score an A in size, a B in number of limitations, and A in the number of elements when compared with the thresholds.

In particular implementations, the content of a claim may be compared to various thresholds to determine a score or rating for the claim. The threshold may include one or more size thresholds, word count thresholds, limitation count thresholds, claim element thresholds, one or more uniqueness thresholds (e.g., how many claims have similar claim limitations or claim elements), one or more frequency of use thresholds (e.g., how often is a claim limitation or claim element used within legal or technical document associated with the field), among others. A resulting claim score, such as the score ABA from the example above, may then be compared to scores of other claims in the claims peer group claim set profile to determine that the first claim ranks in the top X % of the peer group claim set profile. In this manner, claims of a peer group can be relatively ranked based on the words used in claim limitations and claim elements within the peer group claim set profile.

The scores and/or ratings of claims may be used to evaluate risk of individual patents within the peer group or risk of the peer group itself. The ratings of the claims may also be used to evaluate validity of individual claims or groups of claims within the peer group. In illustrative examples, a peer group may receive a claim set peer group rating based on the ratings of the individual claims or patents within the peer group. The claim set peer group rating may be used to assist with valuation, sale, insuring, and/or trading of a patent portfolio that includes the peer group claims.

Figure 11:
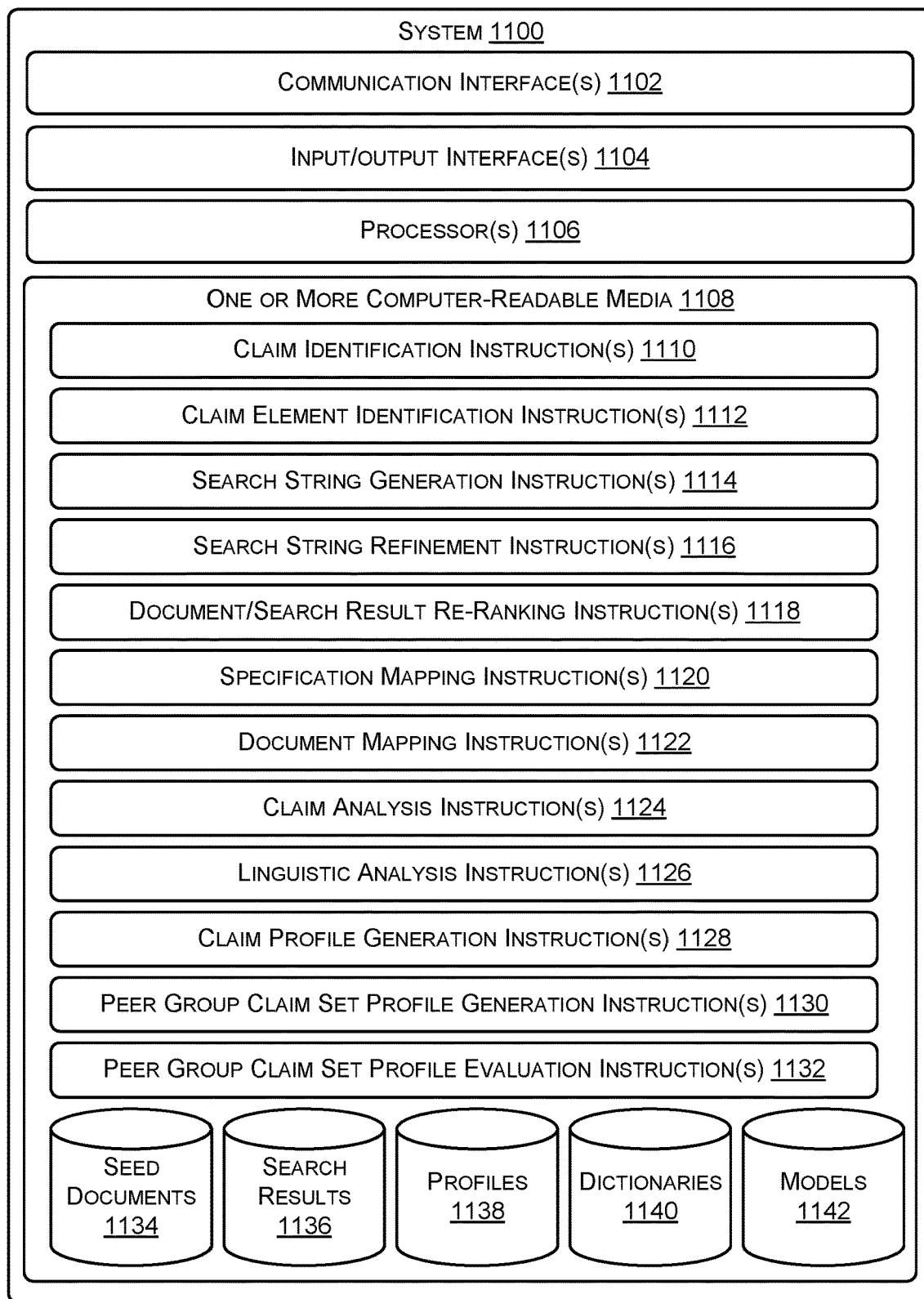
FIG. 11 is an example block diagram of example components of a system for performing document analysis according to some implementations.

FIG. 11 is an example block diagram of example components of a system 1100 for performing claim analysis according to some implementations. The system 1100 may generate claim analysis reports based on an initial seed document or set of seed documents. Additionally, the system 1100 may utilize third-party searching authorities to obtain relevant documents and content associated with one or more claims of the seed document(s). The system 1100 may also perform a comparative analysis between claims of the seed documents themselves. In particular implementations, the system 1100 may perform linguistic analyses of claims of the seed documents and comparative analyses of claims of the seed documents to generate peer group claim set profiles and/or peer group evaluations based on third-party search results.

In the illustrated example, the system 1100 includes communication interfaces 1102 that may support both wired and wireless connection to various networks, such as cellular networks, radio networks (e.g., radio-frequency identification (RFID)), WiFi networks, short-range or near-field networks (e.g., Bluetooth®), infrared signals, local area networks, wide area networks, the Internet, and so forth. For example, the communication interfaces 1102 may exchange data, such as search strings, search results, and documents, with one or more third-party searching authorities.

The system 1100 may also include an input/output interface 1104. The input/output interface 1104 may display or provide information to a user and receive inputs from an end user. The input/output interface 1104 may include various systems for allowing a user to interact with the system 1100, such as mechanical input devices (e.g., keyboards, mice, buttons, etc.), displays, input sensors (e.g., motion, fingerprint, facial recognition, or gesture sensors), and/or microphones for capturing natural language input, such as speech. In various examples, the input interface and the output interface may be combined in one or more touch screen capable displays.

The system 1100 may also include processing resources as represented by processors 1106, such as at least one or more access components, control logic circuits, central processing units, or processors, and computer-readable storage media 1108. The computer-readable storage media 1108 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

Several modules such as instructions, data stores, and so forth may be stored within the computer-readable media 1108 and configured to execute on the processors 1106. For example, the computer-readable media 1108 may store claim identification instructions 1110, claim element identification instructions 1112, search string generation instructions 1114, search string refinement instructions 1116, document/search result re-ranking instructions 1118, specification mapping instructions 1120, document mapping instructions 1122, claim analysis instructions 1124, linguistic analysis instructions 1126, claim profile generation instructions 1128, peer group claim set profile generation instructions 1130, and peer group claim set profile evaluation instructions 1132. The computer-readable media 1108 may also store data, such as seed documents 1134 (e.g., documents provided by a user), search results 1136 (e.g., documents or content returned by a third-party searching authority), profiles 1138 (e.g., claim profile and/or claim set peer group profiles), dictionaries 1140 (e.g., English dictionaries, patent dictionaries, other dictionaries usable for parsing text), and models 1142 (e.g., models usable by machine learning or other techniques to assist with claim detection, search string refinement, linguistic analysis, and/or claim analysis, among others).

The claim identification instructions 1110 may cause the system 1100 to process the seed document and to identify any content of the seed document that corresponds to a claim. The claim identification instructions 1110 may cause the system 1100 to determine the content associated with the claims via document labels or identifiers within the seed documents. For instance, the portion of a seed document including the claims may have titles, metadata, or section headers that identifies the portion of content as claims separate from other portions. In additional examples, the claim identification instructions 1110 may cause the system 1100 to utilize preamble detection or other claim recognition techniques. To illustrate, the claim identification instructions 1110 may cause the system 1100 to parse the content of the seed documents to perform syntactical analysis and to distinguish the claims from the reminder of the content based on the linguistic analysis results. The claim identification instructions 1110 may also cause the system 1100 to identify claims of the seed document based on formatting of portions of the seed document. That is, claims may have particular formatting profiles, such as the indentation of multiple lines or having multiple paragraphs within a single sentence, that the system 1100 may utilize to parse the seed documents in order to identify one or more claims of the seed document.

The claim element identification instructions 1112 may cause the system 1100 to ingest or analyze the content associated with the claims to isolate claim elements. In particular implementations, the claim element identification instructions 1112 may cause the system 1100 to parse and/or a linguistically analyze the content associated with the claims to divide the claims into digestible segments or elements, such as words, phrases, or other definable text-strings. For example, the claim element identification instructions 1112 may utilize a set of NLP components or rules that are customer to claim language and can perform various language analyses on the text of the claims.

The search string generation instructions 1114 may cause the system 1100 to generate one or more search strings that may be provided to a third-party searching authority. Additionally, the search string generation instructions 1114 may utilize the description of drawings of seed documents, claims of seed documents, other content from the seed documents, as well as other documents related to the seed documents to generate the one or more search strings. In illustrative examples, as claim elements often have patent specific grammar and wording, the search string generation instructions 1114 may cause the system 1100 to generate plain English alternatives for the claim elements for use as part of the one or more search strings.

The search string refinement instructions 1116 may cause the system 1100 to generate a frequency of occurrence of terms of search strings and/or claim elements within each of the documents of the collection of documents returned by a third-party searching authority. The search string refinement instructions 1116 may cause the system 1100 to prune or remove search strings that have a frequency of occurrence below a first threshold frequency in the collection of documents. In additional implementations, the search string refinement instructions 1116 may cause the system 1100 to prune or remove search strings that have a frequency of occurrence greater than a second threshold frequency. In various implementations, the search string refinement instructions 1116 may cause the system 1100 to prune search strings that have a frequency of occurrence that is both less than the first threshold and search strings that have frequency of occurrence greater than the second threshold. The search string refinement instructions 1116 may also cause the system 1100 to sort the documents of the collection of documents returned by the third-party searching authority into groups based on issuance date, priority date, or date of publication. In these implementations, a first group of the collection of documents may have a date prior to the priority date of a seed document and a second group of the collection of documents may have a date after or following the priority date of a seed document.

The document/search result re-ranking instructions 1118 may cause the system 1100 to re-rank one or more collections of documents received from the third-party searching authorities. As discussed above, each searching authority may return the documents in an order of importance as determined according to various criteria selected by the searching authority. However, the order of importance or ranking generated by the third-party searching authority often differs from the order of importance attributed by one skilled in the field of intellectual property. That is, the ranking of documents produced by a third-party searching authority may not correspond with criteria associated with patent infringement or invalidity analyses. Thus, the document/search result re-ranking instructions 1118 may cause the system 1100 to re-rank collections of documents or search results received from conventional third-party searching authorities according to criteria different from those utilized by the third-party searching authorities. In illustrative examples, the document/search result re-ranking instructions 1118 may cause the system 1100 to re-rank the documents within the collection using a term frequency-inverse document frequency technique.

The specification mapping instructions 1120 may cause the system 1100 to generate claim element to specification mappings. Generating the claim element to specification mappings may first include identifying usage of claim elements within the specification and/or identification of terms substantially similar to or used as an alternative to the terms of a claim element within the specification of a seed document that includes the claim element. The specification mapping instructions 1120 may cause the system 1100 to generate a claim element to specification mapping that includes potential definitions of the claim element, potential limiting features, potential examples of the claim element, etc. The claim to specification mapping may also include citations to locations in the specification in which the claim element is used or defined (e.g., paragraph number, page number, specification text, etc.).

The document mapping instructions 1122 may cause the system 1100 to generate claim element to collection document mapping. The claim element to collection mapping may include identifying usage of at least a portion of terms included in the claim element within the content of the collection of documents returned by a third-party searching authority in response to a search string. Generating a claim element to collection mapping may also include identifying terms substantially similar to those of the claim element or terms used as an alternative to terms of the claim element within the content of a collection of documents. The claim element to collection mapping may also include citations to the individual documents in which terms of the claim element are used (e.g., document number, paragraph number, page number, etc.).

The claim analysis instructions 1124 may cause the system 1100 to generate a claim analysis report based at least in part on a re-ranked collection of documents, a claim element to specification mapping, and/or a claim element to collection mapping. The claim analysis report may include a claim chart, a claim validity or invalidity analysis, patent valuation estimations, claim ranking reports, as well as other mappings, charts, or reports usable by experts in the field. In particular implementations, a claim chart may be generated by generating a user interface that includes a document having at least one column that includes one or more claim elements and at least one additional column that includes text and/or citations from one or more documents of the collection of documents that corresponds to an individual claim element. The claim chart may also include individual rows that corresponds to an element or a particular group of elements. The portions of the document from the collection of documents that are associated with the claim element in the claim chart may be identified by the system 1100 in a claim element to document mapping generated by the document mapping instructions 1122.

The linguistic analysis instructions 1126 may cause the system 1100 to perform one or more linguistic analyses on claims associated with seed documents. For example, the linguistic analysis instructions 1126 may cause the system 1100 to may parse claim language to perform a syntactical analysis of the claims. The syntactical analysis may produce one or more of sentence structure, POS tagging, PAS, entity type assignment and/or co-reference chains. Multiple sets of linguistic analysis results may be produced for each claim. To illustrate, the linguistic analysis instructions 1126 may cause the system 1100 to produce multiple parts-of-speech tagging results and/or multiple sentence structures for a claim due to some ambiguity with respect to one or more terms included in the claim. In these situations, each of the linguistic analyses of the claims may be utilized by the system 1100 to generate various metrics for the claims. The metrics may then be used to generate claim profiles. In particular implementations, the linguistic analysis instructions 1126 may include a claim parsing engine to perform one or more linguistic analyses of the claims.

In certain implementations, the linguistic analysis instructions 1126 may be executed to cause the system 1100 to analyze the claim language and produce a set of linguistic analysis results including a syntactic parse (e.g., a claim structure diagram) that provides information pertaining to sentence structure of the claims. The linguistic analysis instructions 1126 may include a linguistic analyzer for natural language processing. For instance, the linguistic analysis instructions 1126 may cause the system 1100 to break the claim into a number of segments, such as words, phrases, sentences, or other definable text-strings. The linguistic analysis instructions 1126 may include a set of natural language processing components that perform various language analyses or linguistic analyses on text strings associated with the claims. In particular implementations, the linguistic analysis instructions 1126 may include a syntactic parser that identifies the parts of speech of words and the grammatical relationships between the parts of speech of the words in a claim. In illustrative implementations, the syntactic parser may be implemented in part based on the Stanford CoreNLP package for syntactic parsing. The linguistic analysis instructions 1126 may also include predicate-argument structure module that produces a parser-neutral representation of predicates and instantiated arguments of the parser-neutral representation of predicates. The predicate-argument structure module may transform a parser-specific representation of grammatical relations to a common representation of predicates and arguments so that grammatical information produced by different parsers may be utilized by the system 1100. The predicate-argument structure module also performs certain normalization procedures, such as changing passive voice into active voice, and simplifies the predicate-argument representation of the claim by removing certain grammatical relations that are not central to processing of the claim.

The claim profile generation instructions 1128 may cause the system 1100 to perform claim profile generation on each of the claims and/or documents of the collection of documents. The claim profiles may include one or more of the claim limitations and/or claim metadata related to the claims. In particular implementations, the words of a claim may be tagged or labeled according to a linguistic analysis or syntactic analysis to assist the system 1100 in understanding the structure of the claim. Using the tagged claims, the claim profile generation instructions 1128 may then cause the system 1100 to generate a claim profile. In various implementations, the claim profile generation instructions 1128 may cause the system 1100 to determine a metric, such as a count of words included in a claim based on a linguistic analysis of the claim. Additionally, the claim profile generation instructions 1128 may also cause the system 1100 to determine metrics that include a count of various parts of speech included in the claim based on a linguistic analysis of the claim.

Further, the claim profile generation instructions 1128 may cause the system 1100 to determine unique words included in the claim and/or identify stop words included in the claim. Stop words usually refer to the most common words in a language. Stop words may include short function words such as "the" "is," "at," "which," and "on," as well as others. However, there is no universal list of stop words. The stop words may be included directly in the claim profile generation instructions 1126. Additionally, or alternatively, the stop words may be included in a list that is accessed by the claim profile generation instructions 1128 to identify stop words. The list may be editable to add or remove stop words. Multiple lists of stop words may be available, and in certain situations, particular stop words may be selected based on the type of documents being analyzed. For example, patent specific stop words may include words such as "method" or "comprising" that would not typically be included in a list of general stop words. Similarly, if the claim is part of a specific technical area, the stop words may include words specific to the technical area.

In various implementations, claim profile generation instructions 1126 may cause the system 1100 to identify, based on a linguistic analysis, a number unique words included in the claim with stemming and/or a number of unique words without stemming. Stemming is the process of reducing inflected (or sometimes derived) words to their word stem, base, or root form—generally a written word form. The stem need not be identical to the morphological root of the word; it is usually sufficient that related words map to the same stem, even if this stem is not in itself a valid root. Stemming is an additional form of normalization that removes differences between similar words such as "compare" and "comparing." There are numerous known techniques for stemming including use of a lookup table, suffix stripping, Lemmatisation, stochastic algorithms, n-gram analysis, matching algorithms, etc. In illustrative implementations, the Porter Stemmer algorithm from the publicly available "nltk" package is used to perform stemming.

The peer group claim set profile generation instructions 1130 may cause the system 1100 to perform peer group claim set profile generation. Additionally, the peer group claim set profile generation instructions 1130 may cause the system 1100 to aggregate the metrics of the individual claim profiles into the peer group claim set profile. Each peer group claim set profile may include a number of metrics for the claims included in the peer group. In certain implementations, the peer group claim set profile generation instructions 1130 may utilize one or more linguistic analyses performed by the linguistic analysis instructions 1126. In illustrative examples, the peer group claim set profile may include a peer group identifier, a number of patent documents contributing to the peer group claim set profile, a total number of independent claims within the peer group claim set profile, a full size of the vocabulary used by the identified claims within the peer group patent documents, an average claim size of claims in the peer group collection of documents; a median claim size of claims in the peer group collection of documents, a number of unique limitations in the peer group claim set profile or the peer group collection of documents, a list of unique limitations of claims within the peer group claim set profile, a frequency of occurrence of the claim limitations (or the unique claim limitation) within the claims of the peer group claim set profile, a list of unique elements within the peer group claim set profile, and/or a frequency of occurrence of the claim elements (or the unequip claim elements) within claims of the peer group claim set profile. In addition, frameworks of thresholds defining subsets of claim metrics may be measured relative to the other claims, for example, whether a certain metric places a claim into the upper quartile, or middle third, or lowest 10% of claims included in a peer group. It should be understood that any number of thresholds may be articulated or included in the frameworks of thresholds for various metrics.

The peer group claim set profile evaluation instructions 1132 may cause the system 1100 to perform claim set peer group profile evaluations in which the claims of the peer group claim set profile may be evaluated against the other claims within the peer group claim set profile. For instance, individual claims of the peer group claim set profile may be compared to various threshold metrics and the individual claims may be scored according to the metrics. In one example, a first claim may score an A in size, a B in limitations, and A in elements when compared with the thresholds. In particular implementations, a measure of breadth of a claim may be determined by comparing the metrics of a particular claim with respect to corresponding metrics of the claims included in the peer group.

In illustrative implementations, a claim may score an A in size when the size (or length) of the claim is less than a first size threshold, a B in size when the size (or length) of the claim is less than a second size threshold, a C in size when the size (or length) of the claim is less than a third size threshold, a D in size when the size (or length) of the claim is less than a fourth size threshold, etc. The size or length of a claim may correspond to a total number of words included in the claim. In certain implementations, the size or length of a claim may correspond to a total number of words included in the claim without stop words. In additional examples, a claim may score an A in limitations when the number of limitations of the claim is less than a first size threshold, a B in in limitations when the number of limitations of the claim is less than a second size threshold, a C in in limitations when the number of limitations of the claim is less than a third size threshold, a D in in limitations when the number of limitations of the claim is less than a fourth size threshold, etc. A claim may also score an A in elements when the frequency of use of the elements within a corpus of peer documents is less than a first size threshold, a B in elements when the frequency of use of the elements within the corpus of peer documents is less than a second size threshold, a C in elements when the frequency of use of the elements within the corpus of peer documents is less than a third size threshold, a D in elements when the frequency of use of the elements within the corpus of peer documents is less than a fourth size threshold, etc. In this example, the resulting claim scores, such as ABA, may then be compared to scores of other claims in the claims peer group claim set profile to determine that the first claim ranks in the top X % of the peer group claim set profile and/or to determine a measure of breadth of the claim.

In additional implementations, the scores for size, limitation, and elements may be based on a comparison between other claims of the claim set peer group. For instance, a claim may earn an A in size if the claims is within the smallest 10% of claims of the peer group with respect to word count, a B in size if the claim is in the smallest 40% of the claims of the peer group, a C in size if the claim is in the smallest 70% of the claims of the peer group, otherwise the claim may earn a D in size. Further, a claim may earn an A in limitations if the claim is within the smallest 10% with respect to number of limitations within claims of the peer group, a B in limitations if the claim is in the smallest 40% with respect to number of limitations within claims of the peer group, a C in limitations if the claim is in the smallest 70% with respect to number of limitations within claims of the peer group, otherwise the claim may earn a D in limitations. Each claim may also earn an A in elements if the claim is within the broadest 10% of claims of the peer group with respect to claim elements, a B in elements if the claim is in the broadest 40% of claims of the peer group with respect to claim elements, a C in elements if the claim is in the smallest 70% of claims of the peer group with respect to claim elements, otherwise the claim may earn a D in elements. It should be understood, that the above examples are for illustration purposes only and that the exact percentages or number of scores may vary.

In particular implementations, the evaluations or ratings generated by the execution of the peer group claim set profile evaluation instructions 1132 may be used to evaluate risk of the individual patents or of the peer group itself, generate ratings for the individual patents or for the peer group, or evaluate validity for the individual patents or for the peer group. In specific examples, the peer group may receive a claim set peer group rating based on metrics of the individual claims or patents within the peer group. The claim set peer group rating may be used to assist with valuation, sale, insuring, and/or trading of the entire portfolio.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:
1. A method comprising:
receiving a seed document including content;
determining that the seed document is a patent document and that the content includes a patent claim, wherein the patent document is classified according to a classification;
generating, based upon a natural language processing technique, noun phrases for the patent claim within the seed document, wherein the natural language processing technique segments the patent claim, performs syntactic parsing, generates tagging data associated with the patent claim, and utilizes a claim-specific grammar model to generate the noun phrases;
generating a trained machine learning model configured to identify elements of patent claims, the trained machine learning model trained on a document corpus specific to the seed document;
analyzing the noun phrases to identify an element of the patent claim, the element comprising a plurality of syntactically related concepts in the patent claim, the element being one of a plurality of elements of the patent claim, and the element including a plurality of words, wherein the analyzing is performed utilizing the trained machine learning model;
determining a breadth of the element with respect to one or more additional elements of the plurality of elements of the patent claim;

generating, based at least partly on the breadth of the element, a search string that includes one or more of the words of the plurality of words of the element;

sending the search string to a third-party searching authority;

obtaining a plurality of additional patent documents, the plurality of additional patent documents being classified according to the classification and the plurality of additional patent documents including a first set of additional patent documents having a first priority date before a priority date of the patent document and a second set of additional patent documents having a second priority date after the priority date of the patent document;

determining a first frequency of occurrence of a word of the element of the claim in the first set of additional patent documents;

determining a second frequency of occurrence of the word of the element of the claim in the second set of additional patent documents;

analyzing the first frequency of occurrence of the word with respect to a first threshold frequency of occurrence; and analyzing the second frequency of occurrence of the word with respect to a second threshold frequency of occurrence, the second threshold frequency of occurrence being greater than the first threshold frequency of occurrence.

2. The method as recited in claim 1, further comprising:

performing an analysis of words included in individual documents of the plurality of additional patent documents with respect to the plurality of words included in the element;

determining, based at least partly on the analysis, a portion of a document included in the plurality of additional patent documents that includes at least a portion of the plurality of words included in the element;

generating a mapping indicating an association between the claim element and the portion of the document; and generating data of a user interface that includes the mapping.

3. The method as recited in claim 2, wherein:

the user interface includes a claim chart including at least a first column, a second column, and at least one row;

the first column includes the claim element and the second column includes the portion of the document; and the claim element and the portion of the document are disposed in a same row of the claim chart.

4. The method as recited in claim 1, further comprising:

performing an analysis of words included in portions of the seed document other than a claims portion of the seed document with respect to the plurality of words included in the element;

determining, based at least partly on the analysis, a portion of the seed document that includes at least a portion of the plurality of words included in the element;

generating a mapping indicating an association between the claim element and the portion of the seed document; and generating data of a user interface that includes the mapping.

5. The method as recited in claim 4, further comprising:

determining a measure of validity of the claim based at least partly on the mapping; and generating a user interface that includes the measure of validity.

6. The method as recited in claim 1, further comprising:

determining that the patent claim is an independent claim;

identifying a dependent claim from the content of the seed document;

determining a frequency of occurrence of one or more terms included in the dependent claim in individual documents of the plurality of additional patent documents; and ranking the plurality of additional patent documents based at least in part on the frequency of occurrence of the one or more terms of the dependent claim within the individual documents.

7. The method as recited in claim 1, further comprising:

ranking the plurality of additional patent documents based at least in part on the first frequency of occurrence and the second frequency of occurrence.

8. The method as recited in claim 1, further comprising ranking the plurality of additional patent documents according to a set of criteria that is different from one or more criteria used by the third-party searching authority to rank the plurality of additional patent documents.

9. A system comprising:

one or more communication interfaces;

one or more processors; and non-transitory computer-readable media storing computer-executable instructions, that when executed by the one or more processors cause the one or more processors to perform operation comprising:

obtaining a patent document that includes a claim, wherein the patent document is classified according to a classification;

generating, based upon a natural language processing technique, noun phrases for the patent claim within the patent document, wherein the natural language processing technique segments the patent claim, performs syntactic parsing, generates tagging data associated with the patent claim, and utilizes a claim-specific grammar model to generate the noun phrases;

generating a trained machine learning model configured to identify elements of claims, the trained machine learning model trained on a document corpus specific to the patent document;

analyzing, utilizing the trained machine learning model, the noun phrases to identify an element of the claim, the element comprising a plurality of syntactically related concepts in the claim;

generating, based at least in part on a breadth value of the element, a search string that includes at least one word from the element of the claim;

sending, via the one or more communication interfaces, the search string to a third-party searching authority;

obtaining a plurality of additional patent documents, the plurality of additional patent documents being classified according to the classification and the plurality of additional patent documents including a first set of additional patent documents having a first priority date before a priority date of the patent document and a second set of additional patent documents having a second priority date after the priority date of the patent document;

determining a first frequency of occurrence of a word of the element of the claim in the first set of additional patent documents;

determining a second frequency of occurrence of the word of the element of the claim in the second set of additional patent documents;

analyzing the first frequency of occurrence of the word with respect to a first threshold frequency of occurrence; and analyzing the second frequency of occurrence of the word with respect to a second threshold frequency of occurrence, the second threshold frequency of occurrence being greater than the first threshold frequency of occurrence.

10. The system as recited in claim 9, wherein:
the non-transitory computer-readable media store further computer-executable instructions, that when executed by the one or more processors cause the one or more processors to perform further operations comprising:
determining that the first frequency of occurrence of the word is less than the first threshold frequency of occurrence; and
determining that the second frequency of occurrence of the word is greater than the second threshold frequency of occurrence; and
wherein generating the search string includes adding the word to the search string based at least partly on the first frequency of occurrence of the word being less than the first threshold frequency of occurrence and the second frequency of occurrence of the word being greater than the second threshold frequency of occurrence.

11. The system as recited in claim 9, wherein the non-transitory computer-readable media store further computer-executable instructions, that when executed by the one or more processors cause the one or more processors to perform further operations comprising determining the breadth value of the element based at least partly on first frequency of occurrence of the word and the second frequency of occurrence of the word.

12. The system as recited in claim 9, wherein the non-transitory computer-readable media store additional computer-executable instructions, that when executed by the one or more processors cause the one or more processors to perform additional operations comprising:
receiving a collection of documents from the third-party searching authority, the collection of documents being responsive to the search string and the collection of documents being ranked according to a first order;
modifying rankings of the collection of documents to generate a re-ranked collection of documents, the re-ranked collection of documents being ranked according to a second order; and
generating data of a user interface that includes at least a portion of the re-ranked collection of documents.

13. The system as recited in claim 12, wherein the non-transitory computer-readable media store further computer-executable instructions, that when executed by the one or more processors cause the one or more processors to perform further operations comprising:
modifying the search string to generate a modified search string, the modified search string including an additional word that is different from one or more words included in the search string;
sending, via the one or more communication interfaces, the modified search string to the third-party searching authority; and receiving an additional collection of documents from the third-party searching authority, the additional collection of documents being responsive to the additional search string.

14. The system as recited in claim 13, wherein:
the non-transitory computer-readable media store other computer-executable instructions, that when executed by the one or more processors cause the one or more processors to perform other operations comprising determining an additional word included in at least one document of the plurality of additional patent documents or a portion of the patent document other than a claims portion of the patent document, wherein the additional word is semantically similar to the at least one word from the element of the claim included in the search string, and the modified search string includes the additional word.

15. A method comprising:
obtaining a patent document that includes a claim, wherein the patent document is classified according to a classification;
generating, based upon a natural language processing technique, noun phrases for the patent claim within the patent document, wherein the natural language processing technique segments the patent claim, performs syntactic parsing, generates tagging data associated with the patent claim, and utilizes a claim-specific grammar model to generate the noun phrases;
generating a trained machine learning model configured to identify elements of claims, the trained machine learning model trained on a document corpus specific to the patent document;
analyzing the noun phrases to identify an element of the claim, the element comprising a plurality of syntactically related concepts in the claim, wherein the analyzing is performed utilizing the trained machine learning model;
generating, based at least in part on a breadth value associated with the element, a search string that includes at least one word from the element of the claim;
sending, via one or more communication interfaces, the search string to a third-party searching authority;
obtaining a plurality of additional patent documents, the plurality of additional patent documents being classified according to the classification and the plurality of additional patent documents including a first set of additional patent documents having a first priority date before a priority date of the patent document and a second set of additional patent documents having a second priority date after the priority date of the patent document;
determining a first frequency of occurrence of a word of the element of the claim in the first set of additional patent documents;
determining a second frequency of occurrence of the word of the element of the claim in the second set of additional patent documents;
analyzing the first frequency of occurrence of the word with respect to a first threshold frequency of occurrence; and
analyzing the second frequency of occurrence of the word with respect to a second threshold frequency of occurrence, the second threshold frequency of occurrence being greater than the first threshold frequency of occurrence.

16. The method as recited in claim 15, further comprising:
determining a part of speech for individual words included in the claim; and
determining limitations included in the claim by identifying at least one of nouns, noun and adjective couplings, verbs, or verb and adverb couplings with respect to the words included in the claim; and
wherein the element of the claim includes a plurality of the limitations included in the claim.

17. The method as recited in claim 16, further comprising:
determining a plurality of predicates included in the claim and a plurality of arguments included in the claim;
determining at least one predicate of the plurality of predicates that corresponds to an argument of the plurality of arguments; and
wherein the element of the claim includes at least a grouping of an argument of the plurality of arguments with a predicate of the plurality of predicates.

18. The method as recited in claim 15, wherein:
the plurality of additional patent documents is ranked according to a first order; and
the method further comprises modifying rankings of the plurality of additional patent documents to generate a re-ranked collection of documents, the re-ranked collection of documents being ranked according to a second order.

19. The method as recited in claim 18, further comprising:
determining a portion of a document included in the re-ranked collection of documents that includes at least a portion of words included in the element;
generating a mapping indicating an association between the claim element and the portion of the document; and
generating data of a user interface that includes a claim chart including at least a first column, a second column, and at least one row; and
wherein the first column includes the claim element, the second column includes the portion of the document; and the claim element and the portion of the document are disposed in a same row of the claim chart.

* * * * *